(12) United States Patent
Takada et al.

(10) Patent No.: US 7,776,491 B2
(45) Date of Patent: Aug. 17, 2010

(54) SEPARATOR UNIT AND FUEL CELL STACK

(75) Inventors: Noriyuki Takada, Tokyo (JP); Kenji Kato, Tokyo (JP); Yoshihiro Tamura, Tokyo (JP); Toshihiko Nonobe, Tokyo (JP)

(73) Assignee: Kabushikaisha Equos Research (JP)

( * ) Notice: Subject to any disclaimer, the term of this patent is extended or adjusted under 35 U.S.C. 154(b) by 501 days.

(21) Appl. No.: 11/370,064

(22) Filed: Mar. 8, 2006

(65) Prior Publication Data
US 2006/0204806 A1    Sep. 14, 2006

(30) Foreign Application Priority Data
Mar. 11, 2005   (JP) ............................... 2005-070050

(51) Int. Cl.
H01M 4/64       (2006.01)

(52) U.S. Cl. .................................................... 429/517

(58) Field of Classification Search ................. 429/26, 429/34, 38
See application file for complete search history.

(56) References Cited

U.S. PATENT DOCUMENTS

| | | | | |
|---|---|---|---|---|
| 3,432,357 | A | * | 3/1969 | Dankese ....................... 429/34 |
| 4,548,876 | A | * | 10/1985 | Bregoli .......................... 429/39 |
| 5,776,624 | A | | 7/1998 | Neutzler |
| 5,919,584 | A | | 7/1999 | Akagi |
| 5,972,530 | A | | 10/1999 | Shelekhin et al. |
| 6,296,964 | B1 | | 10/2001 | Ren et al. |
| 6,444,340 | B1 | * | 9/2002 | Jaffrey .......................... 429/30 |
| 6,468,681 | B1 | | 10/2002 | Horiguchi |
| 6,835,477 | B1 | | 12/2004 | Brambilla et al. |
| 7,056,608 | B2 | * | 6/2006 | Lloyd et al. .................... 429/12 |
| 7,150,931 | B1 | | 12/2006 | Jeffrey |
| 2003/0082423 | A1 | | 5/2003 | Kushibiki et al. |
| 2003/0087140 | A1 | | 5/2003 | Kikuchi et al. |
| 2004/0137304 | A1 | | 7/2004 | Tanaka et al. |
| 2004/0200187 | A1 | | 10/2004 | Warrier et al. |
| 2005/0250003 | A1 | | 11/2005 | Zagaja et al. |

FOREIGN PATENT DOCUMENTS

| | | |
|---|---|---|
| DE | 19517443 | 11/1996 |
| GB | 2240988 | 8/1991 |
| JP | 05-029009 | 2/1993 |
| JP | 06-044981 | 2/1994 |

(Continued)

*Primary Examiner*—Patrick Ryan
*Assistant Examiner*—Thomas H. Parsons
(74) *Attorney, Agent, or Firm*—Bacon & Thomas, PLLC

(57) ABSTRACT

A separator unit inserted into a fuel cell having an electrolyte layer interposed between a fuel electrode and an oxygen electrode is provided with a plate like separator that separates fuel gas supplied to the fuel electrode from oxidizing gas supplied to the oxygen electrode, and a mesh like collector having an opening that forms one of a passage through which the fuel gas flows and a passage through which the oxidizing gas flows. The collector is provided to at least one side of the separator base in abutment against one of the fuel electrode and the oxygen electrode. The separator base has a coolant passage formed therein, through which a coolant is allowed to flow, and an electrode abutment portion of the collector, which abuts against one of the fuel electrode and the oxygen electrode, has an aperture ratio higher than those of other portions of the collector.

13 Claims, 19 Drawing Sheets

FOREIGN PATENT DOCUMENTS

| | | |
|---|---|---|
| JP | 06-338338 | 12/1994 |
| JP | 07-254424 | 10/1995 |
| JP | 08-306371 | 11/1996 |
| JP | 10-247505 | 9/1998 |
| JP | 10-340734 | 12/1998 |
| JP | 2002-184422 | 6/2002 |
| WO | WO 01/48852 | 7/2001 |

* cited by examiner (a)

(b)

SEPARATOR UNIT AND FUEL CELL STACK

The disclosure of Japanese Patent Application No. 2005-070050 filed on May 11, 2005 including the specification, drawings and abstract is incorporated herein by reference in its entirety.

BACKGROUND OF THE INVENTION

1. Field of the Invention

The invention relates to a separator unit and a fuel cell stack.

2. Description of the Related Art

A fuel cell that discharges no harmful substance while exhibiting high power generation efficiency has been put into practice as a power generating system for industrial and household use or as a power source for a satellite, spacecraft or the like. Recently, the fuel cell serving as the power source for vehicles like passenger cars, buses, and trucks has been under development. The fuel cell of alkaline solution type, phosphoric acid type, molten carbonate type, solid oxide type, direct methanol type and the like may be employed. However, the proton-exchange membrane type fuel cell is mostly employed as it reacts at a relatively low temperature and is advantageous to downsizing.

In the aforementioned fuel cell, a membrane electrode assembly (MEA) formed by joining two gas diffusion electrodes and a solid polymer electrolyte membrane interposed therebetween is employed. One of the above gas diffusion electrodes serves as a fuel electrode (anode electrode), on which hydrogen gas is supplied as a fuel, decomposing an hydrogen molecule into hydrogen ions (protons) and electrons so that the hydrogen ions permeate the solid polymer electrolyte membrane. The other gas diffusion electrode serves as an oxygen electrode (cathode electrode), on which air is supplied as an oxidizer so that oxygen in the air is combined with the hydrogen ions and electrons, generating water. The above-described electrochemical reaction generates an electromotive force.

The proton-exchange membrane type fuel cell has a stack structure in which a separator is provided on an outer side of the MEA to form a passage for supplying reactant gas including hydrogen gas as the fuel gas, and oxygen as the oxidizer gas. The separator serves to prevent permeation of the reactant gas into adjacent MEAs in the stack direction, and to collect the generated electric current that is brought to the outside. A plurality of unit cells each having the MEA and the separator are stacked to form a fuel cell stack.

In the fuel cell system, the heat energy substantially equivalent to the generated power in each of those cells is generated through the electrochemical reaction. Especially the proton-exchange membrane fuel cell operated at a low temperature is provided with a cooling unit that prevents excessive temperature rise in the respective cells as disclosed in Japanese Patent Application Publication Nos. JP-A-8-306371 and JP-A-10-340734.

In the generally employed fuel cell system as mentioned above, a temperature distribution may occur with respect to the stack direction of the unit cells, thus increasing the temperature of the electrode. In this case, quantity of water that dissipates outside the MEA through the electrode is likely to become excessive, thereby reducing the humidity within the MEA and thus reducing the power generation efficiency in each of the cells.

SUMMARY OF THE INVENTION

A separator unit according an aspect of the invention is inserted into a fuel cell having an electrolyte layer interposed between a fuel electrode and an oxygen electrode, and provided with a plate like separator base that separates gas supplied to the fuel electrode from gas supplied to the oxygen electrode, and a collector provided to at least one side of the separator base, which is provided with a mesh like opening and in abutment against one of the fuel electrode and the oxygen electrode to radiate a heat generated in the fuel cell. The collector includes a turbulence generating unit that generates a turbulence in the gas to increase an opportunity of a contact between the gas and one of the fuel electrode and the oxygen electrode, and to improve an efficiency of radiating the heat generated in the fuel cell.

A separator unit according to another aspect of the invention is inserted into a fuel cell system having an electrolyte layer interposed between a fuel electrode and an oxygen electrode, and provided with a plate like separator base that separates gas supplied to the fuel electrode from gas supplied to the oxygen electrode, and a collector provided to at least one side of the separator base, which is provided with a mesh like opening and in abutment against one of the fuel electrode and the oxygen electrode to radiate a heat generated in the fuel cell. The collector has an aperture ratio that varies toward a gravity direction.

In the separator unit according to another aspect of the invention, the aperture ratio varies to be higher as an area of the collector proceeds downward in the gravity direction.

In the separator unit according to another aspect of the invention, the collector is provided with projecting portions and base portions extending in the gravity direction, which are alternately formed.

In a fuel cell stack according to an aspect of the invention formed by stacking fuel cells each having an electrolyte layer interposed between a fuel electrode and an oxygen electrode with a separator unit inserted therein, the separator unit includes a plate like separator base that separates gas supplied to the fuel electrode from gas supplied to the oxygen electrode, and a collector provided to at least one side of the separator base, which is provided with a mesh like opening and in abutment against one of the fuel electrode and the oxygen electrode to radiate a heat generated in the fuel cells, and the collector has an aperture ratio that varies toward a direction in which the fuel cells are stacked.

In the fuel cell stack according to another aspect of the invention, the collector includes an electrode abutment portion that abuts against one of the fuel electrode and the oxygen electrode, a separator abutment portion that abuts against the separator base, and a rib portion between the electrode abutment portion and the separator abutment portion, each aperture ratio of which establishes a relational expression:(1)

> aperture ratio of the electrode abutment portion>aperture ratio of the rib portion≧aperture ratio of the separator abutment portion.

In a fuel cell stack according to another aspect of the invention formed by stacking fuel cells each having an electrolyte layer interposed between a fuel electrode and an oxygen electrode with a separator unit inserted therein, the separator unit includes a plate like separator base that separates gas supplied to the fuel electrode from gas supplied to the oxygen electrode, and a collector provided to at least one side of the separator base, which is provided with a mesh like opening and in abutment against one of the fuel electrode and the oxygen electrode to radiate a heat generated in the fuel cells. The collector has an aperture ratio that varies in a direction orthogonal to a direction in which the fuel cells are stacked.

In the fuel cell stack according to another aspect of the invention, the aperture ratio varies to be higher as an area of the collector proceeds downward in the gravity direction.

According to the invention, the temperature distribution in the fuel cell stack is eliminated to control the temperature of the fuel cell appropriately, thus maintaining the humidity within the fuel cell appropriately and enhancing the power generation efficiency. Also, the cooling capability and outputs of the fuel cell are improved.

According to the invention, water diffusion within the gas flow passage is facilitated to prevent stagnation of water within the passage so that the gas flow is not interrupted by water. This makes it possible to effectively cool the fuel cell even in the high humidity environment, thus improving the cooling capability and the power generation efficiency of the fuel cell as well as stabilizing the operation.

In the fuel cell stack, the temperature distribution with respect to the stack direction of the fuel cells is eliminated so as not to increase temperatures at the oxygen electrode and the fuel electrode. Therefore, quantity of water that dissipates outside of the fuel cell may be suppressed through the oxygen electrode and the fuel electrode. This makes it possible to appropriately maintain the humidity within the fuel cell and to improve the power generation efficiency therein.

Further, the water diffusion within the gas flow passage in the fuel cell stack is facilitated to prevent stagnation of water within the passage so that the gas flow is not interrupted by water. This makes it possible to effectively cool the fuel cell even in the high humidity environment, thus improving the cooling capability and the power generation efficiency of the fuel cell stack as well as stabilizing the operation.

BRIEF DESCRIPTION OF THE DRAWINGS

FIG. 9A is a plan view representing the structure of the collector at the air electrode side, and FIG. 9B is a view taken along line E-E of FIG. 9A;

FIG. 12A is a perspective view of the collector at the air electrode side, and FIG. 12B is a perspective view of a plate material having mesh-like openings forming the collector at the air electrode side;

DETAILED DESCRIPTION OF THE PREFERRED EMBODIMENTS

Figure 1:
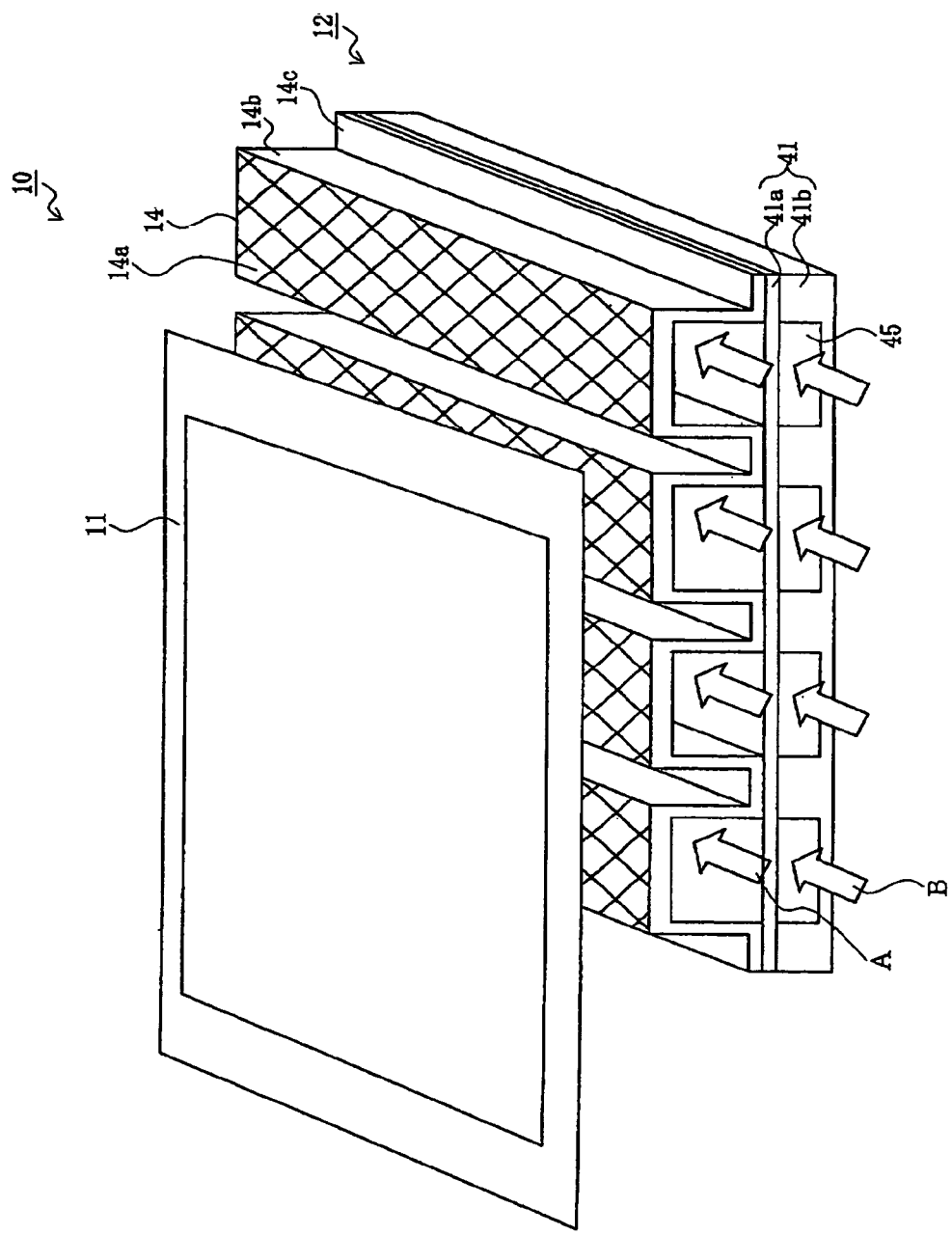
FIG. 1 is a schematic view of a separator unit of a fuel cell system according to a first embodiment of the invention.

Hereinafter, an embodiment of the invention will be described in detail referring to the drawings.

Figure 2:
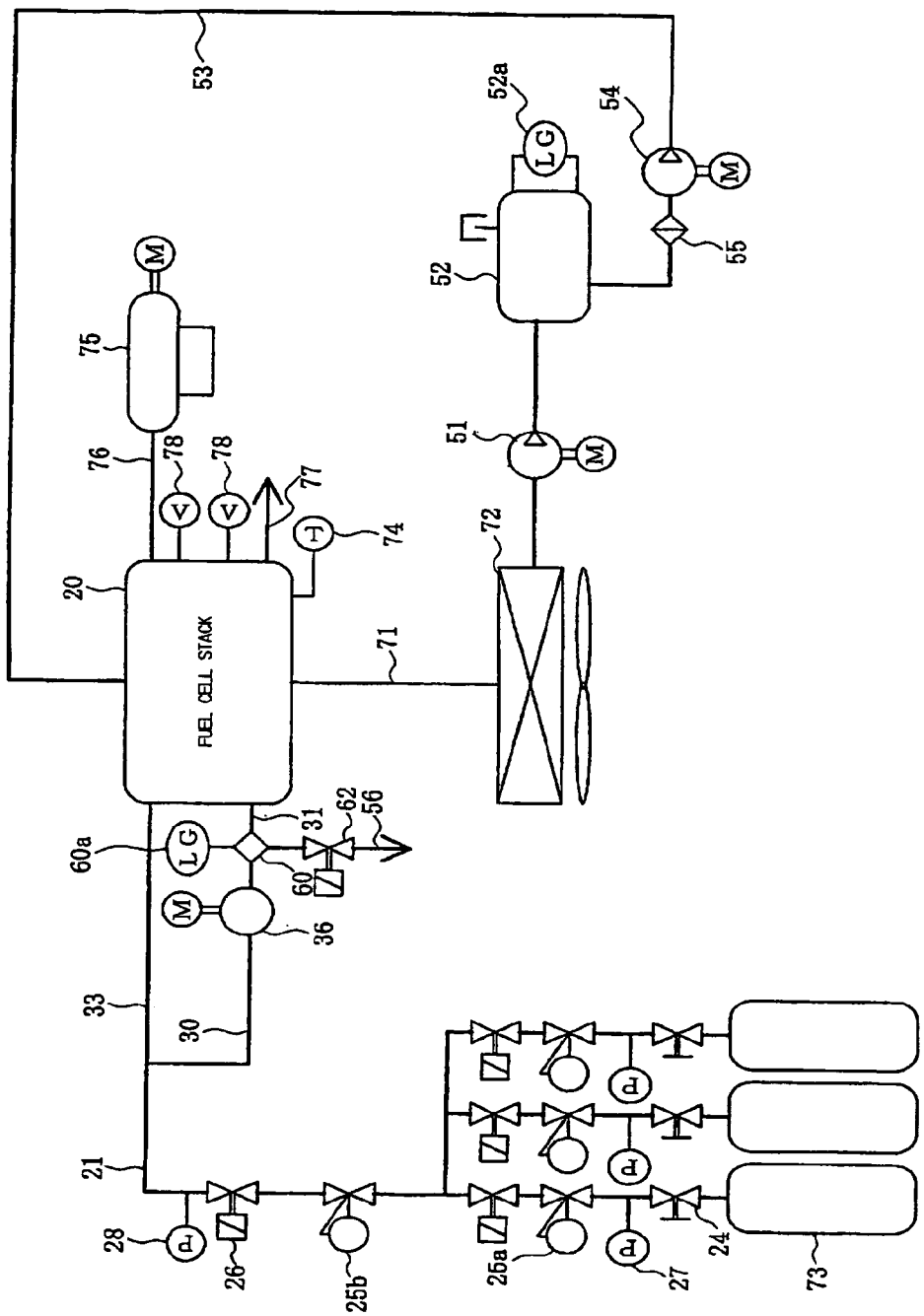
FIG. 2 is a diagram that represents a structure of the fuel cell system according to the first embodiment of the invention.
Figure 3:
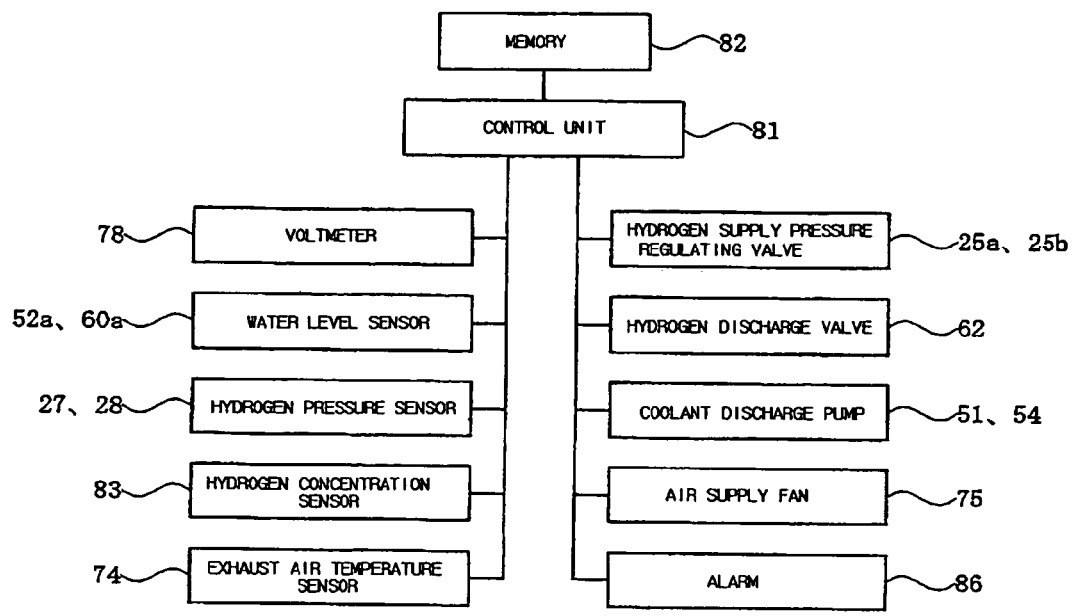
FIG. 3 is a block diagram that represents a structure of a control system of the fuel cell system according to the first embodiment of the invention.
Figure 4:
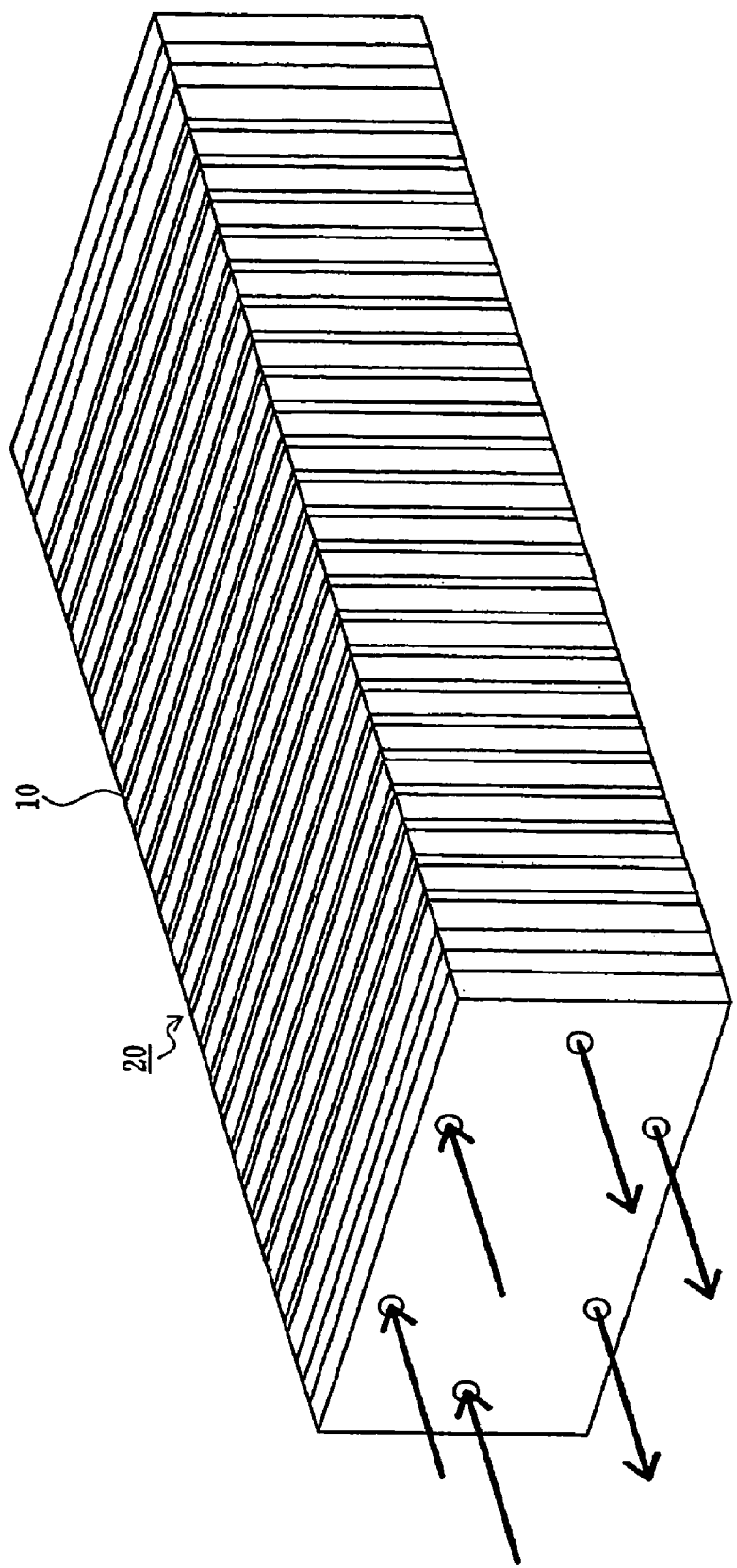
FIG. 4 is a perspective view that represents the structure of a fuel cell stack according to the first embodiment of the invention.

FIG. 2 is a diagram that represents a structure of a fuel cell system according to a first embodiment of the invention. FIG. 3 is a block diagram that represents a structure of a control system of the fuel cell system according to the first embodiment of the invention. FIG. 4 is a perspective view that represents a structure of a fuel cell stack according to the first embodiment of the invention.

FIGS. 2 and 4 show a fuel cell stack 20 serving as a fuel cell (FC) that is used as a power source for vehicles including cars, buses, trucks, passenger carts, luggage carts and the like. Such vehicles are provided with a large number of power consuming accessories such as a light unit, a radio and a power window, which are used even when the vehicles are parked. The power source is required to provide a substantially wide range of outputs to cope with various operation patterns. Preferably the fuel cell stack 20 serving as the power source is used with a secondary battery serving as an electric storage device (not shown).

Preferably the fuel cell stack 20 is formed as a proton-exchange membrane fuel cell (PEMFC), although it may be alkaline solution fuel cell (AFC), a phosphoric acid fuel cell (PAFC), a molten carbonate fuel cell (MCFC), a solid oxide fuel cell (SOFC), a direct methanol fuel cell (DMFC) or the like.

More specifically, in the proton exchange membrane fuel cell (PEMFC or PEM), the hydrogen gas is used as the fuel, and oxygen or air is used as the oxidizer. The fuel cell of PEM type includes a stack formed by bonding a plurality of fuel cells in series, each having catalysts, electrodes and separators provided at both sides of the solid polymer electrolyte membrane that allows permeation of ions such as protons or the like.

According to the present embodiment, the fuel cell stack 20 includes a plurality of cell modules 10 as shown in FIG. 4. Each arrow shown in FIG. 4 represents the flow direction of the coolant in a closed cooling system among a plurality of systems for cooling the fuel cell stack 20. The cell module 10 is formed of a plurality of sets stacked in the thickness direction (the direction of a diagonal line connected between the lower left and the upper right of FIG. 4). Each of those sets includes a unit cell (MEA) 11 to be described later with respect to the fuel cell, a separator unit 12 (also described later) that electrically connects the unit cells 11 and separates a passage of the hydrogen gas introduced to the unit cell 11 from the passage of air, and a frame (not shown) that supports the unit cell 11 and the separator unit 12.

FIG. 2 is a view of the device that supplies hydrogen gas as the fuel gas and air as the oxidizer to the fuel cell stack 20. Note that the hydrogen gas obtained by reforming methanol, gasoline or the like with the reforming device (not shown) may be directly supplied to the fuel cell stack 20 as the fuel gas. However, it is preferable to supply the hydrogen gas stored in a fuel storage unit 73 so that sufficient quantity of hydrogen gas can be supplied stably even in a high load operation state of the vehicle. This makes it possible to supply sufficient quantity of hydrogen gas substantially at a constant pressure. Accordingly, the fuel cell stack 20 is capable of supplying the required electricity in response to change in the vehicle load without delay. In this case, the output impedance of the fuel cell stack 20 may be made extremely low with the approximation to 0.

The hydrogen gas flows from the fuel storage unit 73, which includes a container that stores a hydrogen storing alloy, a container that stores a hydrogen storing liquid such as decalin, and a hydrogen gas cylinder passes through a first fuel supply passage 21 as a fuel supply pipe and a second fuel supply passage 33 connected to the first fuel supply passage 21 as a fuel supply pipe to be supplied to the fuel chamber of the fuel cell stack 20. The first fuel supply passage 21 is provided with a switching valve 24 for the fuel storage unit, hydrogen pressure sensors 27, 28 serving as the pressure sensor for detecting the hydrogen gas pressure, hydrogen supply pressure regulating valves 25a, 25b for regulating the pressure of the supplied hydrogen gas, and an electromagnetic valve 26 for fuel supply.

The fuel storage unit 73 has the sufficient capacity and capability of supplying the hydrogen gas constantly at a sufficiently high pressure. In the example shown in FIG. 2, three fuel storage units 73, for example, are provided. The first fuel supply passage 21 is branched into a plurality of portions at the point to which the respective fuel storage units 73 are connected, and the branched passages are joined at the intermediate portion. However, a single fuel storage unit may also be employed. The number of the fuel storage units may be arbitrarily determined.

The hydrogen gas flowing out of the fuel chamber of the fuel cell stack 20 passes through a fuel discharge passage 31 so as to be discharged outside the fuel cell stack 20. The fuel discharge passage 31 is provided with a water collecting drain tank 60 as a collecting container. The water collecting drain tank 60 is connected to a fuel discharge passage 30 that discharges water and the separated hydrogen gas. The fuel discharge passage 30 is provided with a suction circulating pump 36 as a forcible fuel discharge device. At an end portion of the fuel discharge passage 30 opposite to the water collecting drain tank 60 is connected to the second fuel supply passage 33. The hydrogen gas introduced outside the fuel cell stack 20 is collected so as to be supplied to the fuel chamber of the fuel cell stack 20 for reusing purposes.

The water collecting drain tank 60 is connected to a fuel discharge passage 56 that is provided with a hydrogen discharge valve 62 through which the hydrogen gas discharged from the fuel chamber upon start-up of the fuel cell stack 20 is discharged into atmosphere. The fuel discharge passage 56 may be provided with a hydrogen combustion device if necessary, in which the discharged hydrogen gas is combusted so as to discharge resultant water into atmosphere.

The hydrogen supply pressure regulating valves 25a and 25b may be a butterfly valve, a regulator valve, a diaphragm valve, a mass flow controller, a sequential valve or the like. However, they may be of any type so long as the pressure of the hydrogen gas flowing from outlets of the hydrogen supply pressure regulating valves 25a, 25b can be regulated to a predetermined pressure. The pressure may be manually adjusted. However, it is preferably adjusted by an actuator including an electric motor, a pulse motor, an electromagnet or the like. The fuel supply electromagnetic valve 26 and the hydrogen discharge valve 62 are of ON/OFF switching type, which are operated by the actuator including the electric motor, the pulse motor, the electromagnet or the like. The switching valve 24 for the fuel storage unit is operated manually or automatically with the electromagnetic valve. The suction circulation pump 36 may be of any type so long as the hydrogen gas is forcibly discharged so that the inside of the fuel chamber is brought into a negative pressure state.

Air serving as the oxidizer flowing from an air supply fan 75 as an oxidizer supply source passes through an oxidizer supply passage 76 so as to be supplied to an oxygen chamber of the fuel cell stack 20. An air cylinder and an air tank may be employed as the oxidizer supply source in place of the air supply fan 75. Oxygen may be used as the oxidizer in place of air. Air discharged from the oxygen chamber passes through an exhaust manifold 77 so as to be discharged into atmosphere.

Water may be sprayed into air supplied to the oxygen chamber from the air electrode of the fuel cell stack 20 for the purpose of maintaining the unit cells 11 in a wet state. In this case, water supplied from a water tank is sprayed into air through a water supply nozzle provided at the intermediate portion of the oxidizer supply passage 76 or at the inlet of the oxygen chamber of the fuel cell stack 20. Preferably a condenser may be provided at an intermediate portion of the exhaust manifold 77 or the like where water contained in the air discharged from the oxygen chamber is collected and reused.

Air supplied to the oxygen chamber of the fuel cell stack 20 may be in a state where the atmospheric pressure is kept or in a pressurized state where the pressure is higher than the atmospheric pressure. In the present embodiment, description will be given, in which the air is at the atmospheric pressure. That is, in the embodiment, the fuel cell system is the one operated at the atmospheric pressure rather than the system under pressure.

FIG. 2 shows a device as a closed cooling system as one of those for cooling the fuel cell stack 20. The fuel cell stack 20 is connected to a coolant supply passage 53 through which the coolant supplied to the fuel cell stack 20 passes and a coolant discharge passage 71 through which the coolant discharged from the fuel cell stack 20 passes. A coolant storage container 52 is connected to each end of the coolant supply passage 53 and the coolant discharge passage 71 opposite to the fuel cell stack 20. The coolant supply passage 53 is provided with a coolant supply pump 54 as a coolant pump and a filter 55. The coolant discharge passage 71 is provided with a radiator 72 as a cooling device for cooling the coolant and a coolant discharge pump 51 as the coolant pump. The coolant in the embodiment may be water, however, it may be antifreeze solution or any other fluid. The coolant discharge pump 51 and the coolant supply pump 54 may be of any type so long as it admits the coolant such as water so as to be discharged therethrough. The filter 55 may be of any type so long as it serves to remove dust, impurities and the like contained in the coolant such as water.

The coolant supplied to the fuel cell stack 20 passes through the coolant passage 45 within the separator base 41 (to be described later) of the separator unit 12 in each of the cell modules 10 so as to be cooled. In this case, the coolant circulates within a substantially closed cooling system formed by connecting the coolant storage container 52, the coolant supply passage 53, the fuel cell stack 20, and the coolant discharge passage 71, and is never brought into contact with the unit cells 11. As a result, the coolant is not brought into contact with such members as the solid polymer electrolyte membrane, catalyst, electrodes and the like. Therefore, the coolant with the content that may adversely affect the members included in the unit cell 11, such as the antifreeze solution, may be used.

The hydrogen gas supplied to the fuel chamber of the fuel cell stack 20 and air supplied to the oxygen chamber also have a function of cooling the fuel cell stack 20. The device for supplying hydrogen gas as the fuel gas and air as the oxidizer to the fuel cell stack 20 functions as one of the cooling systems for cooling the fuel cell stack 20. As the hydrogen gas and air are consumed and discharged to the outside, the device for supplying the hydrogen gas and air may be considered as an open cooling system. In this case, the hydrogen gas and air pass through the cell module 10 so as to be cooled while contacting with such members as the solid polymer electrolyte membrane, catalyst, and electrodes that are included the unit cell 11. As described above, if water is supplied into air supplied to the oxygen chamber, the cooling capability is enhanced.

The fuel cell stack 20 is provided with a voltmeter 78 that measures the terminal voltage of the electrical terminal (not shown), and an exhaust air temperature sensor 74 that detects the temperature of air circulating within the fuel cell stack 20, or a temperature of air discharged from the fuel cell stack 20. The coolant storage container 52 and the water collecting drain tank 60 are provided with water level sensors 52a and 60a for detecting the water level, respectively.

Generally, a lead storage battery, a nickel/cadmium battery, a nickel hydride battery, a lithium-ion battery, a sodium sulfur battery may be employed as the electric storage device in the form of the secondary battery. However, the electric storage device is not limited to the battery and may be of any form so long as it has a function of electrically storing and discharging the energy, for example, the capacitor (condenser) such as an electrical double layer capacitor, a fly wheel, a superconductive coil, or a pressure reservoir. One of the aforementioned electric storage devices or a plurality thereof may be used independently or in combination.

The fuel cell stack 20 applies the electric current to the load (not shown) connected thereto. The load herein generally refers to an inverter unit serving as a drive control unit which converts the direct current from the fuel cell stack 20 or the electric storage device into the alternate current so as to be supplied to a drive motor for rotating the wheels of the vehicle. The drive motor herein also functions as a generator, which generates a so called regenerative electric current in a deceleration state of the vehicle. In this case, the drive motor is rotated by the wheels of the vehicle to generate electric power, which functions as a braking unit of the vehicle for applying the braking force to the wheels. The regenerative electric current is supplied to the electric storage device to be charged therein.

In the embodiment, the fuel cell system includes a control unit as shown in FIG. 3. Referring to a block diagram of FIG. 3, a control unit 81 is a computer that includes a calculation unit such as CPU or MPU, an input/output interface, and the like for controlling operations of the fuel cell system. The control unit 81 is connected to a memory 82 as a data storage unit such as an electromagnetic disk or a semiconductor memory. The control unit 81 is connected to the voltmeter 78, the water level sensors 52a and 60a, the hydrogen pressure sensors 27 and 28, the exhaust air temperature sensor 74, and a hydrogen concentration sensor 83 that detects the concentration of the hydrogen gas discharged from the fuel chamber of the fuel cell stack 20. Various outputs from those devices are input to the control unit 81. The hydrogen supply pressure regulating valves 25a and 25b, the hydrogen discharge valve 62, the air supply fan 75, the coolant supply pump 54 and the coolant discharge pump 51 as the coolant pump, and an alarm 86 that outputs an alarm upon failure and accident in the fuel cell system may be connected to the control unit 81 for controlling operations thereof.

Next, a structure of the separator unit 12 will be described in detail.

Figure 5:
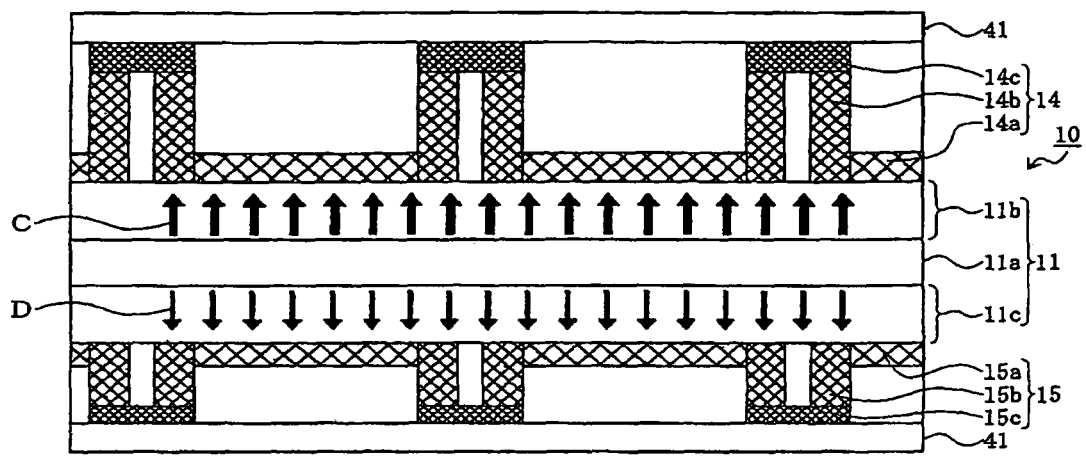
FIG. 5 is a sectional view of a cell module of the fuel cell system according to the first embodiment of the invention.
Figure 6:
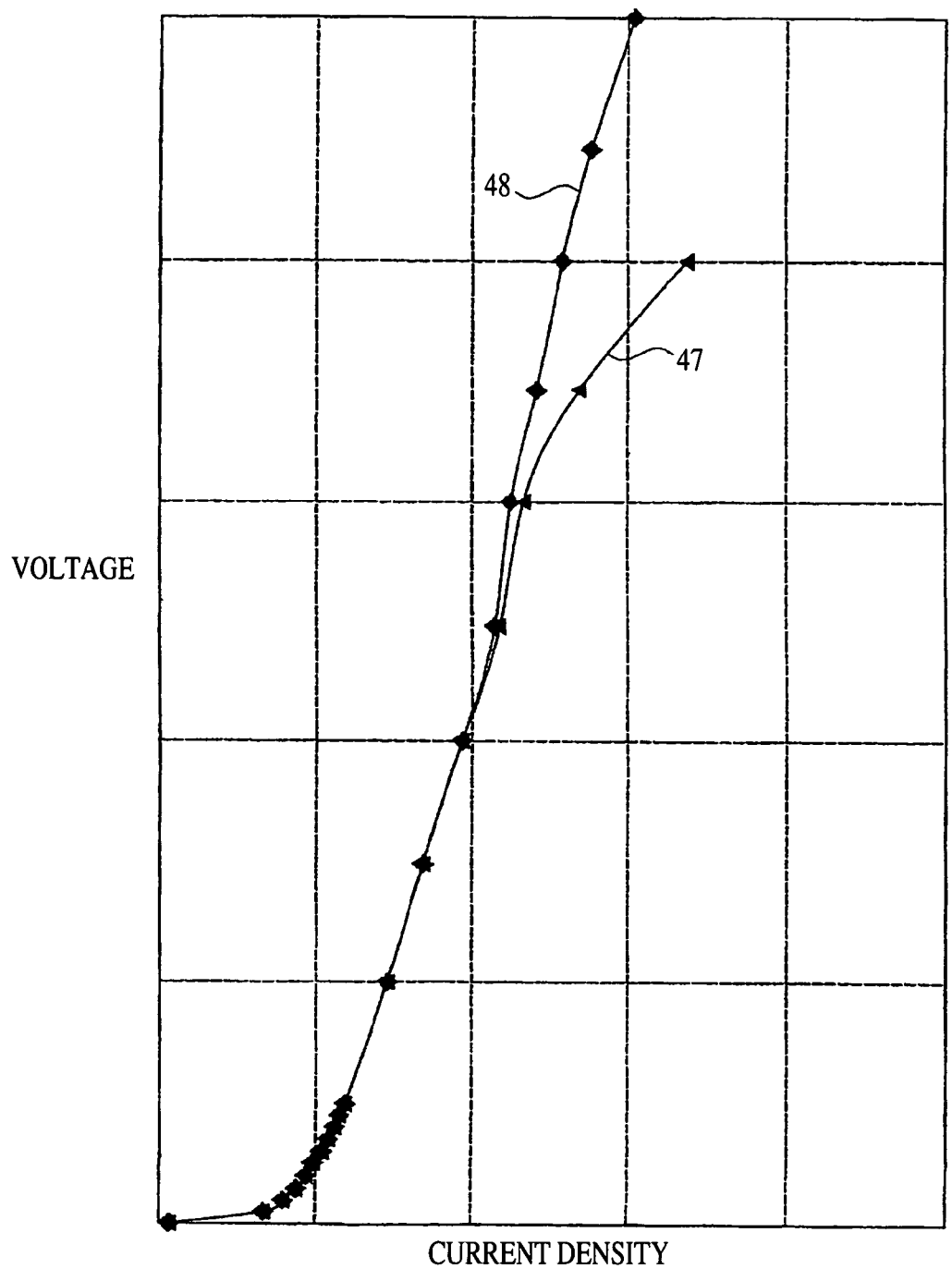
FIG. 6 is a graph that represents a power generating performance of the fuel cell system according to the first embodiment of the invention.

FIG. 1 is a view representing a structure of the separator unit of the fuel cell system according to the first embodiment of the invention. FIG. 5 is a sectional view representing a structure of the cell module of the fuel cell system according to the first embodiment of the invention. FIG. 6 is a graph representing the power generation performance of the fuel cell system according to the first embodiment of the invention.

Referring to FIGS. 1 and 5, a plurality of the cell modules 10 are stacked, each has a unit cell 11 and a separator unit 12. The separator unit 12 electrically connects the adjacent unit cells 11, and separates an oxygen chamber as a passage through which air flows and a fuel chamber as a passage through which the hydrogen gas introduced into the unit cell 11 flows. FIG. 1 is a perspective view that represents an enlarged portion of the stacked cell modules 10. FIG. 5 is a sectional view that represents an enlarged portion of the stacked cell modules 10. The frame that supports the unit cells 11 and the separator unit 12 are not shown for the purpose of simplifying the explanation.

Referring to FIG. 5, the unit cell 11 is formed of a solid polymer electrolyte membrane 11a as an electrolyte layer of an ion-exchange membrane, an air electrode 11b (cathode electrode) as an oxygen electrode provided at one side of the solid polymer electrolyte membrane 11a, and a fuel electrode 11c (anode electrode) provided at the other side of the solid polymer electrolyte membrane 11a. The air electrode 11b and the fuel electrode 11c include electrode diffusion layers each formed of a conductive material that allows diffusion and permeation of the reactant gas, and catalytic layers formed on the electrode diffusion layer including the catalytic substance supported in contact with the solid polymer electrolyte membrane 11a, respectively. The solid polymer electrolyte membrane 11a, the air electrode 11b and the fuel electrode 11c are not shown in FIG. 1.

The separator unit 12 is formed of a separator base 41 serving as a gas block member between the unit cells 11, a collector 14 at the air electrode side, serving as a mesh-like collector, which is provided at one side of the separator base 41 for collecting electricity in contact with the electrode diffusion layer at the air electrode 11*b* of the unit cell 11 and provided with a plurality of openings that allow permeation of an air/water mixture, and a collector 15 at the fuel electrode side, serving as a mesh-like collector, which is provided at the other side of the separator base 41 for feeding electricity to the outside in contact with the electrode diffusion layer at the fuel electrode 11*c* of the unit cell 11. The collector 15 at the fuel electrode side is not shown in FIG. 1 for convenience of explanation.

Each of the collector 14 at the air electrode side and the collector 15 at the fuel electrode side is formed of a conductive plate material, for example, a thin metal plate having a thickness of about 0.2 mm. The separator base 41 is a plate-like member formed of a thin metal plate having a thickness smaller than those of the collectors. For example, it has a dual structure including a first plate member 41*a* and a second plate member 41*b* having a coolant passage 45 formed therein. The collectors 14 and 15 at the air electrode and the fuel electrode sides, and the separator base 41 may be formed by subjecting the metal that exhibits conductivity and anti-corrosion property such as a stainless steel, nickel alloy and titanium alloy to an anti-corrosion conductive treatment such as gold plating.

The collector 14 at the air electrode having substantially a rectangular shape with a long length in a lateral direction is formed of a porous body. The porous body is formed of a metal plate material with mesh-like openings of the aperture ratio of 59% or higher, such as an expand metal and a punching metal. The above-described metal plate is formed into a corrugated plate provided with thin extending projections formed through a press working process. Each of the projections has a side wall portion 14*b* and a tip portion 14*c*. The projections extend in the longitudinal direction of the plate material, that is, in the vertical direction in FIG. 5, which are arranged in parallel at equal intervals so as to be formed over the plate surface completely. The cross section of the projection is formed into a substantially corrugated rectangular shape, having a base portion with slightly wider width resulting from punching out in the course of the press working. The height of the projection is substantially the same as the thickness of the frame (not shown) such that an air passage with a predetermined opening area is formed to longitudinally pierce through the portion between the electrode diffusion layer at the air electrode 11*b* of the unit cell 11 and the side surface of the separator base 41 in the stack state. Referring to FIG. 1, an arrow A represents the flow of air introduced into the unit cell 11 to flow through the oxygen chamber. The flat surface of the tip portion 14*c* of the projection abuts against the surface of the separator base 41, and a flat surface of a base portion 14*a* of the projection abuts against the electrode diffusion layer at the side of the air electrode 11*b* of the unit cell 11.

The collector 15 at the fuel electrode side is formed of a porous body having the same size as that of the collector 14 at the air electrode side. The porous body is formed of a metal plate material with mesh-like openings such as an expand metal and a punching metal. The above-described metal plate is formed into a corrugated plate provided with thin extending projections formed through a press working process. Each of the projections has a side wall portion 15*b* and a tip portion 15*c* like the collector 14 at the air electrode side. The projections vertically extend as shown in FIG. 5, and arranged in parallel at equal intervals so as to be formed over the plate surface completely. The cross section of the projection is formed into a substantially corrugated rectangular shape, having a base portion with slightly wider width resulting from punching out in the course of the press working. The height of the projection is substantially the same as the thickness of the frame (not shown) such that a fuel gas passage with a predetermined opening area is formed to longitudinally pierce through the portion between the electrode diffusion layer at the fuel electrode 11*c* of the unit cell 11 and the side surface of the separator base 41 in the stack state. The flat surface of the tip portion 15*c* of the projection abuts against the side surface of the separator base 41, and a flat surface of a base portion 15*a* of the projection abuts against the electrode diffusion layer at the side of the fuel electrode 11*c* of the unit cell 11.

The collectors 14 and 15 at the air electrode and the fuel electrode sides are arranged to interpose the separator base 41 therebetween with the respective base portions 14*a* and 15*a* placed outward. The respective tip portions 14*c* and 15*c* of the projections of the collectors 14 and 15 at the air electrode and the fuel electrode sides abut against the separator base 41 so as to allow application of electric current therebetween. The air passage, that is, oxygen chamber at one side of the separator base 41 and the fuel gas passage, that is, the fuel chamber at the other side thereof may be formed by stacking the collectors 14 and 15 at the air electrode and the fuel electrode sides, having the separator base 41 interposed therebetween. Air is supplied from the oxygen chamber into the air electrode 11*b* of the unit cell 11, and likewise, the hydrogen gas is supplied from the fuel chamber into the fuel electrode 11*c* of the unit cell 11.

Water is allowed to flow through the unit cell 11. When the hydrogen gas as the fuel gas is supplied into the fuel chamber provided with the collector 15 at the fuel electrode side, hydrogen is decomposed into hydrogen ions (proton) and electrons. The hydrogen ion permeates the solid polymer electrolyte membrane 11*a* together with carrier water. In the case where the air electrode 11*b* serves as the cathode electrode and air as the oxidizer is supplied into the oxygen chamber, oxygen contained in air is bonded to the hydrogen ion and the electron to generate water. The water content permeates the solid polymer electrolyte membrane 11*a* as back diffusion water to flow into the fuel chamber. The back diffusion water refers to water generated in the oxygen chamber that diffuses within the solid polymer electrolyte membrane 11*a*, and permeates therethrough in the direction reverse to that of the hydrogen ion to reach the fuel chamber.

The separator base 41 is connected to a coolant inlet pipe and a coolant outlet pipe. The coolant that enters through the coolant inlet pipe passes through the coolant passage 45 formed within the separator base 41 for cooling, and discharged through the coolant outlet pipe. The coolant used to flow through the closed cooling system is supplied to the fuel cell stack 20 through the coolant supply passage 53 so as to flow into the coolant inlet pipe through the passage (not shown) formed within the fuel cell stack 20. The coolant discharged through the coolant outlet pipe enters into the coolant discharge passage 71 through the passage (not shown) in the fuel cell stack 20 so as to be discharged therefrom. The coolant passage 45 may be formed into a straight, serpentine or whorl shape with the increased length.

Referring to FIG. 1, the separator base 41 is formed by bonding the first plate member 41*a* and the second plate member 41*b* together. In this case, a groove with an arbitrary shape is formed in the inner surface of the second plate member using a photolithography technique such as chemical etching. The first plate member 41*a* is then stacked on the grooved surface of the second plate member 41*b* to form the separator base 41 having the coolant passage 45 therein. In this case, as both side surfaces of the separator base 41 are bonded at the respective points for the purpose of improving the conductivity in the portion therebetween. Preferably the outer surfaces of the separator base 41 are flat with no irregularity. This ensures to make the outer surface of the separator base 41 in contact with the tip portions 14c and the 15c of the collectors 14 and 15 at the air electrode and the fuel electrode sides, thus improving the heat conductance and electric conductivity therebetween.

In the first embodiment, each of the collectors 14 and 15 at the air electrode and the fuel electrode sides is formed such that the aperture ratio is locally varied. For example, they are formed such that each of the base portions 14a and 15b, that is, the electrode abutment portion that abuts against the unit cell 11 as the MEA contact portion has the highest aperture ratio, each of the tip portions 14c and 15c, that is, the separator abutment portion that abuts against the separator base 41 as the separator contact portion has the lowest aperture ratio, and each of the side wall portions 14b and 15b as a rib forming portion has the aperture ratio in the range between those of the 14a, 15a and the 14c, 15c. Each of the aperture ratio of the side wall portions 14b and 15b may be set to the value equal to that of the tip portion 14c or 15c. That is, the aperture ratio at the respective areas of the collectors 14 and 15 at the air electrode side and the fuel electrode side is set to be graded in the stack direction (vertical direction shown in FIG. 5) of the unit cell 11, and varies as defined by the following equation.

$$\text{Aperture ratio at MEA contact portion} > \text{aperture ratio at rib} \geq \text{aperture ratio at separator contact portion} \quad (1)$$

Each of the collectors 14 and 15 at the air electrode and the fuel electrode sides has mesh-like apertures such that respective flows of the hydrogen gas within the fuel chamber and air within the oxygen chamber are not interrupted by those collectors 14 and 15. The hydrogen within the fuel chamber and air within the oxygen chamber are sufficiently in contact with the electrode diffusion layers of the fuel electrode 11c and the air electrode 11b of the unit cell 11 through the openings of the base portions 14a and 15a in contact therewith. The hydrogen gas within the fuel chamber and air within the oxygen chamber are allowed to flow through the openings of the side wall portions 14b and 15b, thus facilitating smooth flow of the hydrogen gas in the fuel chamber and air in the oxygen chamber.

In the case where a water droplet is generated in the oxygen chamber owing to produced water or water supplied into air, and such droplet blocks the passage between the adjacent base portions 14a, air is allowed to flow into the adjacent passage through the openings formed in the side wall portion 14b with no interruption. The same effect may be obtained in the case where the droplet is generated in the fuel chamber owing to the back diffusion water.

The unit cells 11 are cooled by the separator base 41 serving as a radiator in a closed cooling system. The heat generated in the respective unit cells 11 is transferred to the separator base 41 through the collectors 14 and 15 at the air electrode and the fuel electrode sides, and further to the coolant that circulates within the separator base 41. The electricity generated in the respective unit cells 11 is also well transferred to the collectors 14 and 15 at the air electrode and the fuel electrode sides.

The heat generated in the unit cell 11 is transferred to the base portions 14a and 15a from the outer surfaces of the air electrode 11b and the fuel electrode 11c, and further to the separator base 41 from the tip portions 14c and 15c through the side wall portions 14b and 15b. Assuming that each of the aperture ratios of the collector 14 and 15 at the air electrode and the fuel electrode sides is kept constant at all the areas, the heat conductance in each of the collectors 14 and 15 at the air electrode and the fuel electrode sides becomes constant at all areas. In this case, as areas of the base portions 14a and 15a are larger than those of the tip portions 14c and 15c, the heat energy per unit area transferred to the tip portions 14c and 15c becomes larger than those transferred to the base areas 14a and 15a. As a result, the thermal resistance at the tip portions 14c and 15c become greater than that at the base portions 14a and 15a. As the aperture ratio increases, the heat conductance at the side wall portions 14b and 15b is lowered, thus increasing the thermal resistance. Especially when water is supplied into air, the side wall portions 14b and 15b function as cooling fins as the radiator. Since the aperture ratio increases, in this case, the area that allows the side wall portions 14b and 15b to serve as the cooling fins is reduced, thus increasing the thermal resistance. When each thermal resistance of the base portions 14a and 15a, and the side wall portions 14b and 15b increases, the temperature distribution occurs in the stack direction of the unit cell 11 as described above. This may increase temperatures of the air electrode 11b and the fuel electrode 11c. Therefore the quantity of water that dissipates to the outside of the unit cell 11 through the air electrode 11b and the fuel electrode 11c becomes excessive to lower the humidity within the unit cell 11. This may reduce the power generation efficiency in the unit cell 11.

In the embodiment, each aperture ratio of the collectors 14 and 15 at the air electrode and the fuel electrode sides is graded in the stack direction of the unit cells 11, and varies as defined in the equation (1). Since each of the tip portions 14c and 15c has a low aperture ratio, and a high area density, the heat energy per unit area that can be transferred is increased, and the thermal resistance is reduced. Each of the side wall portions 14b and 15b also has the low aperture ratio and the high area density. Accordingly the heat energy per unit area that can be transferred is increased, and the thermal resistance is reduced. This may eliminate the temperature distribution in the stack direction of the unit cells 11, and accordingly, each temperature of the air electrode 11b and the fuel electrode 11c is not increased. This makes it possible to suppress each quantity of water that dissipates to the outside of the unit cell 11 through the air electrode 11b as shown by an arrow C in FIG. 5 and of water that dissipates to the outside of the unit cell 11 through the fuel electrode 11c as shown by an arrow D in FIG. 5. The humidity within the unit cell 11 may be appropriately maintained and the power generation efficiency in the unit cell 11 may also be improved.

FIG. 6 is a graph that represents the power generating performance that changes in accordance with the aperture ratio of the collector 14 at the air electrode side and the collector 15 at the fuel electrode side under the low humidity condition, that is, in the state where the unit cell 11 is in the relatively dry state. Referring to FIG. 6, the y-axis represents the voltage of the unit cell 11, and the x-axis represents the current density. Line 47 formed by plotting the filled triangle marks as the experimental results represents the case where each aperture ratio of the collectors 14 and 15 at the air electrode and the fuel electrode sides is kept constant for all areas. Line 48 formed by plotting the filled square marks as the experimental results represents the case where each aperture ratio of the collectors 14 and 15 at the air electrode and the fuel electrode sides is graded in the stack direction of the unit cell 11, and varies as defined in the equation (1). As shown in FIG. 6, in the case where each aperture ratio of the collectors 14 and 15 at the air electrode and the fuel electrode sides is graded in the stacked direction of the unit cell 11, and varies as defined in the equation (1), the power generation efficiency in the unit cell 11 is improved.

Since each of the collectors 14 and 15 at the air electrode and the fuel electrode sides has mesh-like openings, flows of the hydrogen gas within the fuel chamber and air within the oxygen chamber are not interrupted by those collectors 14 and 15, respectively. That is, the hydrogen gas within the fuel chamber and air within the oxygen chamber are sufficiently brought into contact with the electrode diffusion layers of the fuel electrode 11c and the air electrode 11b of the unit cell 11 through the openings of the base portions 14a and 15a in contact with the unit cell 11. Also, since the hydrogen gas within the fuel chamber and air within the oxygen chamber are allowed to flow through the openings of the side wall portions 14b and 15b, each flow of the hydrogen gas within the fuel chamber and air within the oxygen chamber becomes smooth. Especially in the case where a water droplet is generated in the oxygen chamber owing to produced water or water supplied into air, and such droplet blocks the passage between adjacent base portions 14a, air is allowed to flow into the adjacent passage through the openings of the side wall portion 14b without interruption. The same effect may be obtained in the case where the droplet is generated in the fuel chamber owing to the back diffusion water.

Next, operations of the fuel cell system with above structure will be described.

Figure 7:
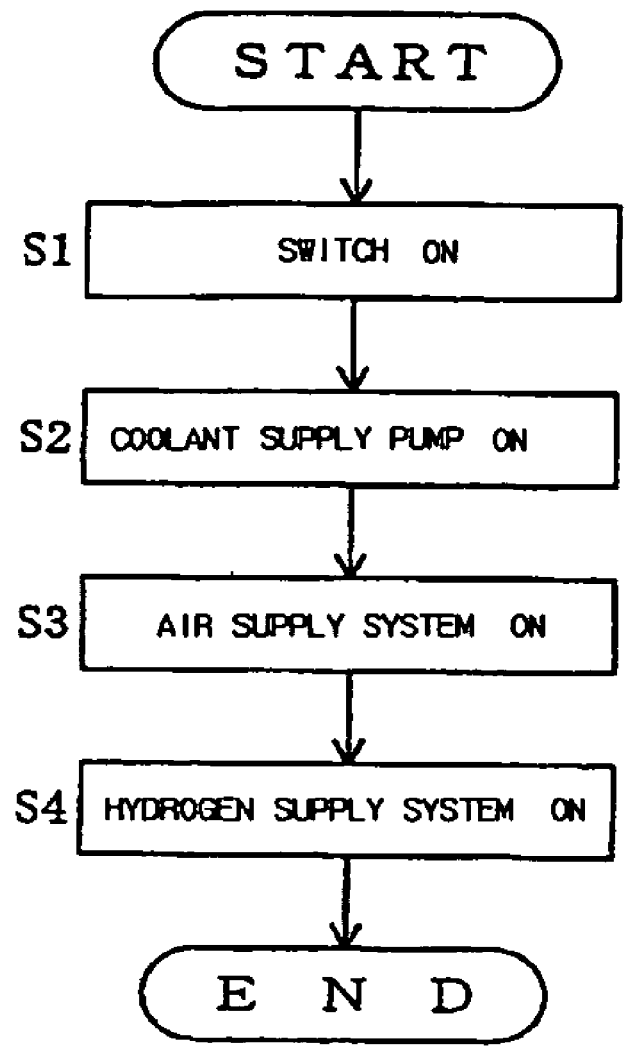
FIG. 7 is a flowchart that represents a process for starting the fuel cell system according to the first embodiment of the invention.
Figure 8:
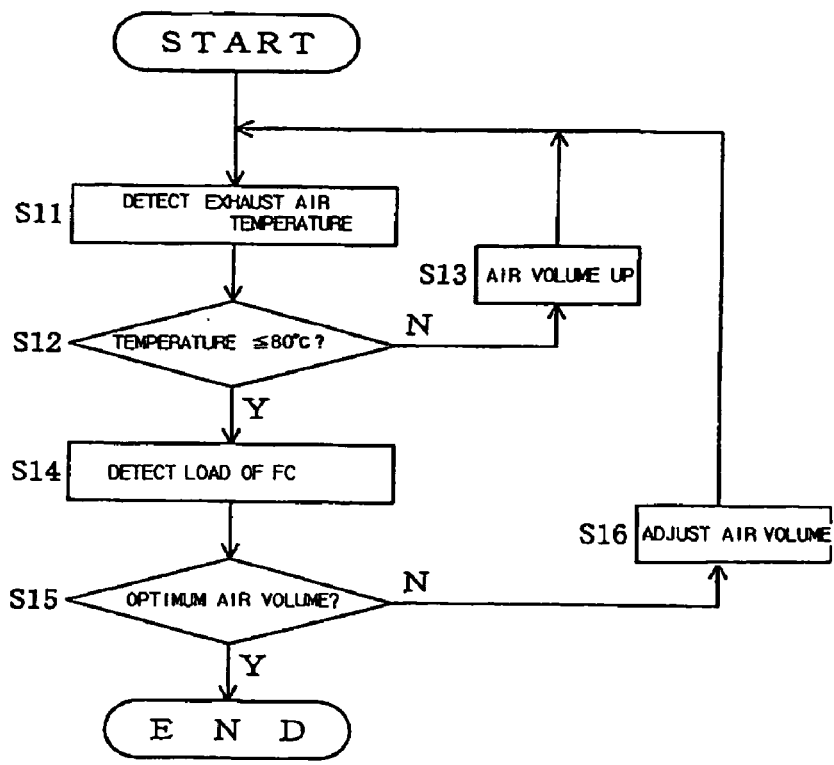
FIG. 8 is a flowchart that represents an air supply quantity control in the fuel cell system according to the first embodiment of the invention.

FIG. 7 is a flowchart that represents a start-up operation of the fuel cell system according to the first embodiment of the invention. FIG. 8 is a flowchart that represents an air supply quantity control for the fuel cell system according to the first embodiment of the invention.

The process for the start-up operation will be described. In step S1, a start switch (not shown) is turned ON by an operator for starting the fuel cell system. Then in step S2, the coolant supply pump 54 and the coolant discharge pump 51, that is, the coolant pump is turned ON. The coolant starts circulating by flowing through the coolant passage 45 within the separator base 41. Then in step S3, the device for supplying air as the oxidizer to the fuel cell stack 20, that is, the air supply system is turned ON. In this case, the control is executed to maximize the quantity of air supplied by the air supply fan 75 such that no abnormal reaction occurs in the unit cell 11 of the fuel cell stack 20. Then in step S4, the device for supplying hydrogen gas as the fuel gas to the fuel cell stack 20, that is, the hydrogen supply system is turned ON. The start-up operation, thus, ends. The fuel cell system operation transfers into the normal operation phase such that the electricity generated by the fuel cell stack 20 is supplied to the loads or the secondary battery.

In the case where the fuel cell system is provided with a device for spraying water into air supplied into the oxygen chamber, it is preferable to start supplying water into air supplied into the oxygen chamber before the hydrogen supply system is turned ON. Otherwise, the abnormal combustion may be caused by the supply of the hydrogen gas to the solid polymer membrane 11a in a dry state, since air is present within the unit cell 11 at the time of start-up of the fuel system, irrespective of whether the air supply system is ON or not. The air electrode 11b of the unit cell 11 has to be preliminarily brought into a wet state by supplying water before supply of the hydrogen gas so as not to damage the unit cell 11 in the case where the abnormal heat is generated due to the abnormal combustion. The abnormal heat may be converted into the evaporative heat such that the moistening of the solid polymer electrolyte membrane 11a is facilitated, thereby preventing the damage exerted to the unit cell 11.

After the start-up routine ends, the control of hydrogen gas supply quantity, air supply quantity, water supply quantity will be executed simultaneously. Under the control of hydrogen gas supply quantity, the hydrogen supply pressure regulating valves 25a and 25b are adjusted such that the hydrogen gas is supplied to the fuel electrode 11c at a predetermined concentration equal to the explosive limit or lower. The hydrogen discharge valve 62 which is closed during start-up is opened based on the predetermined rule so as to discharge the fuel gas at the reduced hydrogen partial pressure for refreshing the atmospheric gas of the fuel electrode 11c. The predetermined rule as described above is stored in the memory 82 which is referred upon execution of the regulation of the hydrogen supply pressure regulation valves 25a and 25b, and switching operation of the hydrogen discharge valve 62 by the controller 81. The hydrogen discharge valve 62 is appropriately opened during the operation to stabilize the voltage. The hydrogen discharge valve 62 is opened on the grounds that if the fuel cell system is operated while keeping the hydrogen discharge valve 62 closed, the partial pressure of the hydrogen consumed by the fuel electrode 11c is gradually decreased under the influence of $N_2$, $O_2$ or the produced water permeating the air electrode 11b, and the output voltage of the fuel cell stack 20 is reduced, accordingly.

Under the air supply quantity control, first in step S11, the temperature of air immediately after discharged from the fuel cell stack 20 is detected by the exhaust air temperature sensor 74. Then in step S12, the control unit 81 determines whether the detected temperature of the discharged air is equal to or lower than 80° C. If it is determined that the temperature of the discharged air is not equal to or lower than 80° C., that is, exceeds 80° C., the process proceeds to step S13 where an air volume is increased by the control unit 81 so as to prevent burning of the unit cell 11. More specifically, air supply quantity is increased by increasing the rotating speed of the air supply fan 75 so as to reduce the temperature of the air electrode 11b serving as the heat source.

Meanwhile if it is determined that the temperature of the discharge air is equal to or lower than 80° C., the process proceeds to step S14 where the load of the fuel cell stack 20, that is, the load of the fuel cell, is detected. Then in step S15, the control unit 81 determines whether the air supply quantity, that is, air volume, is appropriate. In this case, the determination is made by referring to the table of the relationship between the load of the fuel cell stack 20 and the air volume required in the respective states, which is stored in the memory 82. If it is determined that the air volume is inappropriate, the control unit 81 adjusts the air volume in step S16. More specifically, the rotating speed of the air supply fan 7 is adjusted to control the air volume. If it is determined that the air volume is appropriate, the process ends.

Under the hydrogen gas supply quantity control, the hydrogen gas pressure at the fuel storage unit 73 is detected by the hydrogen pressure sensors 27 and 28. The control unit 81 regulates the hydrogen supply pressure regulating valves 25a and 25b, thereby adjusting the pressure of the hydrogen gas supplied to the fuel cell stack 20 to a predetermined value. The control unit 81 controls a switching operation of the fuel supply electromagnetic valve 26 so as to control the hydrogen gas supply to the fuel cell stack 20. The fuel supply electromagnetic valve 26 may be closed for cutting the supply of the hydrogen gas to the fuel cell stack 20.

In the embodiment, each aperture ratio of the collectors 14 and 15 at the air electrode and the fuel electrode sides locally varies so as to be graded in the stack direction of the unit cells 11. This may eliminate the temperature distribution in the stack direction of the unit cells 11, and prevent the increase in temperatures of the air electrode 11b and the fuel electrode 11c. This makes it possible to suppress quantity of water that dissipates to the outside of the unit cell 11 through the air electrode 11b and the fuel electrode 11c. The humidity within the unit cell 11 may be appropriately maintained to enhance the power generation efficiency of the unit cell 11.

As the collectors 14 and 15 at the air electrode and the fuel electrode sides have mesh-like openings, each flow of the hydrogen gas within the fuel chamber and air within the oxygen chamber is not interrupted by those collectors 14 and 15. That is, the hydrogen gas within the fuel electrode and air within the oxygen chamber are sufficiently brought into contact with the electrode diffusion layers at the fuel electrode 11c and the air electrode 11b through openings of the base portions 14a and 15a in contact with the unit cell 11. The hydrogen gas within the fuel chamber and air within the oxygen chamber are allowed to flow through the openings of the side wall portions 14b and 15b, thus making flows of the hydrogen gas within the fuel chamber and air within the hydrogen chamber smooth. Especially, in the case where a water droplet generated in the oxygen chamber owing to produced water or water supplied into air blocks the passage between adjacent base portions 14a, air is allowed to flow into the adjacent passage through openings of the side wall portion 14b with no interruption. The same effect may be obtained in the case where the droplet is generated in the fuel chamber owing to the back diffusion water.

The embodiment only shows an example in which each aperture ratio of the collectors 14 and 15 at the air electrode and the fuel electrode sides is graded with respect to the stack direction of the unit cells 11 so as to eliminate the temperature distribution in the stack direction of the unit cells 11. However, the temperature distribution in the stack direction of the unit cells 11 may also be eliminated by forming the collectors 14 and 15 at the air electrode and fuel electrode sides using a combination of different materials. In this case, the material forming the collectors 14 and 15 at the air electrode and fuel electrode sides is partially changed such that the material forming the base portions 14a and 15a as the MEA contact portions in contact with the unit cell 11 has the lowest heat conductance, the material forming the tip portions 14c and 15c as the separator contact portions in contact with the separator base 41 have the highest heat conductance, and the material forming the side wall portions 14b and 15b as rib forming portions has the heat conductance in the range between those of the base portions 14a and 15a and the tip portions 14c and 15c. The heat conductance of the material forming the side wall portions 14b and 15b may be the same as that of the material forming the tip portions 14c and 15c. In this way, the thermal resistance at the respective areas of the collectors 14 and 15 at the air electrode and the fuel electrode sides may be graded in the stack direction of the unit cells 11, and changes as defined by the following equation (2):

Thermal resistance of MEA contact portion>thermal resistance of rib portion≧thermal resistance of separator contact portion (2)

Next, a second embodiment of the invention will be described. The same elements as those described in the first embodiment will be designated with the same reference numerals, and explanations thereof, thus, will be omitted. The explanation with respect to the same operations and effects as those obtained in the first embodiment will also be omitted.

Figure 9:
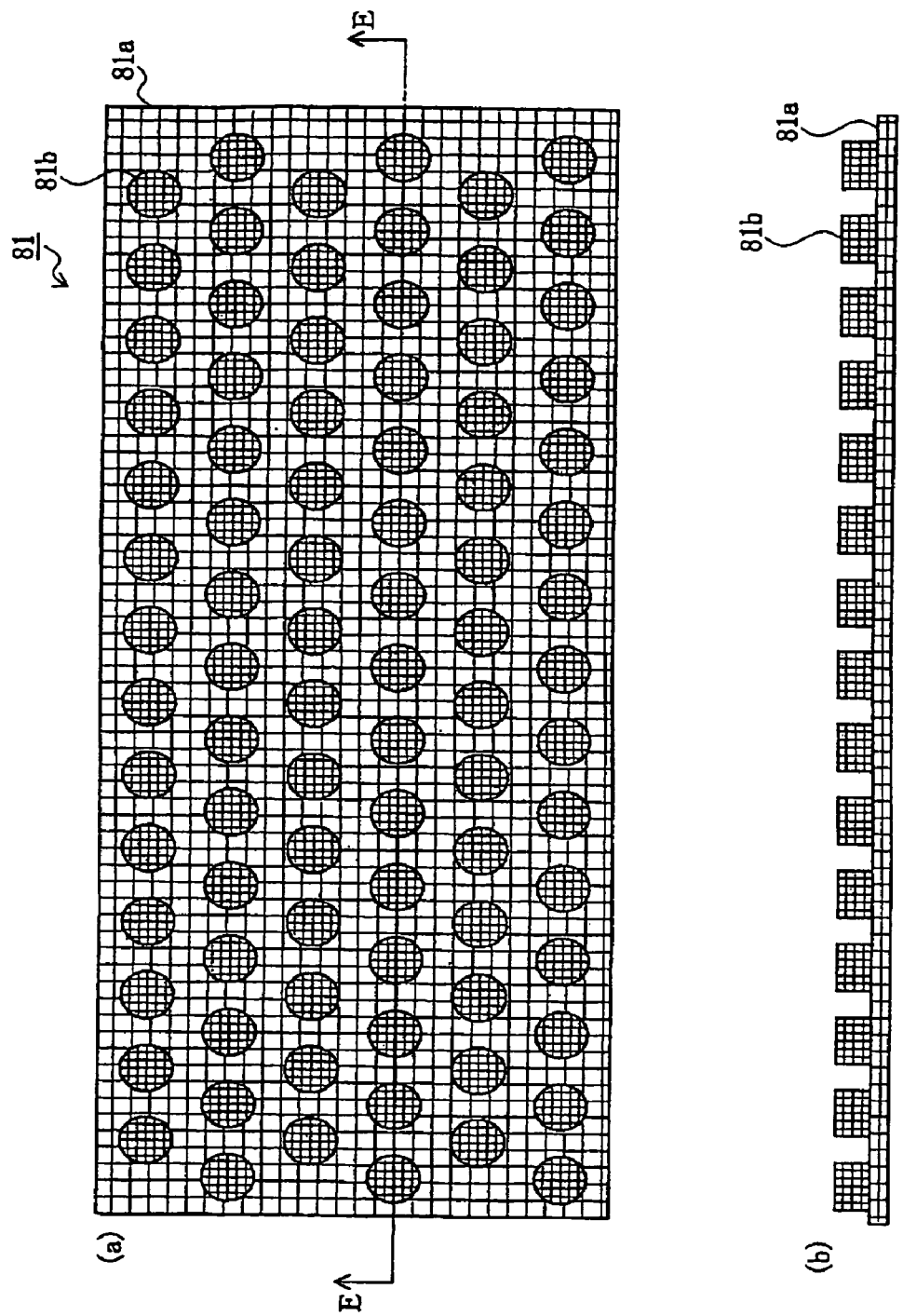
FIG. 9 represents a structure of a collector at the air electrode side in the fuel cell system according to a second embodiment of the invention.

FIG. 9 represents a structure of the collector at the air electrode side in the fuel cell system according to the second embodiment of the invention. FIG. 9A is a plan view representing the structure of the collector at the air electrode side, and FIG. 9B is a view taken along line E-E of FIG. 9A.

In the embodiment, a collector 81 at the air electrode side includes a flat plate-like base 81a, and a plurality of protrusions 81b formed on the base 81a as shown in FIG. 9. As in the case of the first embodiment, the collector 81 at the air electrode side is a porous body formed of a metal plate material with mesh-like openings, for example, an expand metal, a punching metal or the like. The protrusions 81b are formed through the press working process. The collector 81 at the air electrode side is provided in the oxygen chamber within the unit cell 11 by abutting the base 81a against the air electrode 11b of the unit cell 11, and abutting the tip portions of the protrusions 81b against the side surface of the separator base 41. In this case, as the protrusions 81b cause turbulence in air flowing through the oxygen chamber, the heat exchange efficiency between air, and the collector 81 at the air electrode side and the unit cell 11 may be enhanced. The resultant air cooling capability, thus is improved. The cooling capability is further improved by making the aperture ratio of the protrusions 81b lower than that of the base 81a to increase the thermal conductivity.

The collector at the fuel electrode side may be formed to have the similar structure to that of the collector 81 at the air electrode side. In this case, as the turbulence occurs in the hydrogen gas flowing through the fuel chamber, the heat exchange efficiency between the hydrogen gas, and the collector at the fuel electrode side and the fuel cell 11 may be enhanced. The resultant hydrogen gas cooling capability, thus, is improved.

Next, a third embodiment of the invention will be described. The elements of the same structure as those described in the first and the second embodiments will be designated with the same reference numerals, and explanations thereof, thus, will be omitted. The explanation with respect to the same operations and effects as those obtained in the first and the second embodiments will also be omitted.

Figure 10:
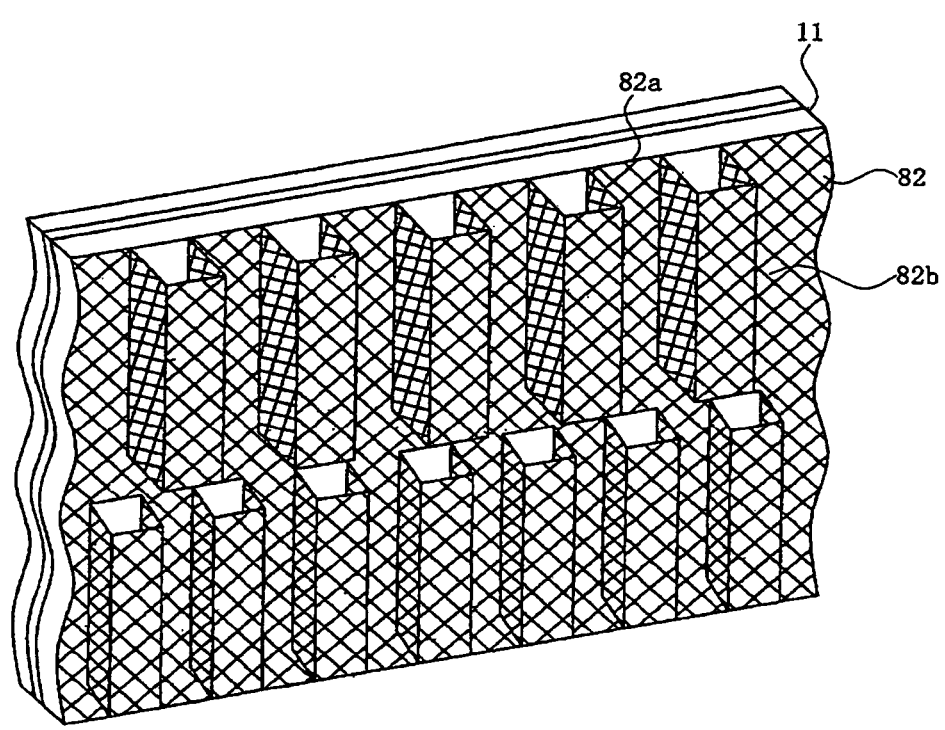
FIG. 10 is a perspective view representing a collector at the air electrode side in the fuel cell system according to a third embodiment of the invention.

FIG. 10 is a view that represents a structure of the collector at the air electrode side in the fuel cell system according to the third embodiment of the invention.

In the embodiment, a collector 82 at the air electrode side is formed as a corrugated plate including a flat plate-like base 82a and thin projecting portions 82b formed on the base 82a through the press working process. As in the case of the first embodiment, the collector 82 at the air electrode side is a porous body formed of a metal plate material with mesh-like openings, for example, an expand metal, a punching metal and the like. The collector 82 at the air electrode side is provided in the oxygen chamber within the unit cell 11 by abutting the base 82a against the air electrode 11b of the unit cell 11, and abutting the tip portions of the projecting portions 82b against the side surface of the separator base 41.

The projecting portions 82b extend in an air flow direction, that is, a vertical direction in FIG. 10. They are divided into a plurality of portions in the vertical direction such that each divided end of the projecting portions is displaced to be out of alignment with respect to the corresponding opposite divided end of the projecting portions in the lateral direction. Likewise, base portions between the adjacent projecting portions 82b are also divided into a plurality of portions in the vertical direction such that each divided end of the base portions is displaced to be out of alignment with respect to the corresponding opposite divided end of the base portions in the lateral direction. The aforementioned structure causes turbulence in air flowing through the oxygen chamber, thus enhancing the thermal exchange efficiency between air, and the collector 82 at the air electrode side and the unit cell 11, and improving the air cooling capability. The aperture ratio of the projecting portions 82b is made lower than that of the base portion 82a to increase the thermal conductivity so that the cooling capability is further improved.

The collector at the fuel electrode side may have the similar structure to that of the collector 82 at the air electrode side. In this case, as the turbulence occurs in the hydrogen gas flowing through the fuel chamber, the thermal exchange efficiency between the hydrogen gas, and the collector at the fuel electrode side and the unit cell 11 is enhanced as well as the cooling capability of the hydrogen gas.

A fourth embodiment of the invention will be described. The elements of the same structure as those described in the first to the third embodiments will be designated with the same reference numerals, and explanations thereof, thus, will be omitted. The explanation with respect to the same operations and effects as those obtained in the first to the third embodiments will also be omitted.

Figure 11:
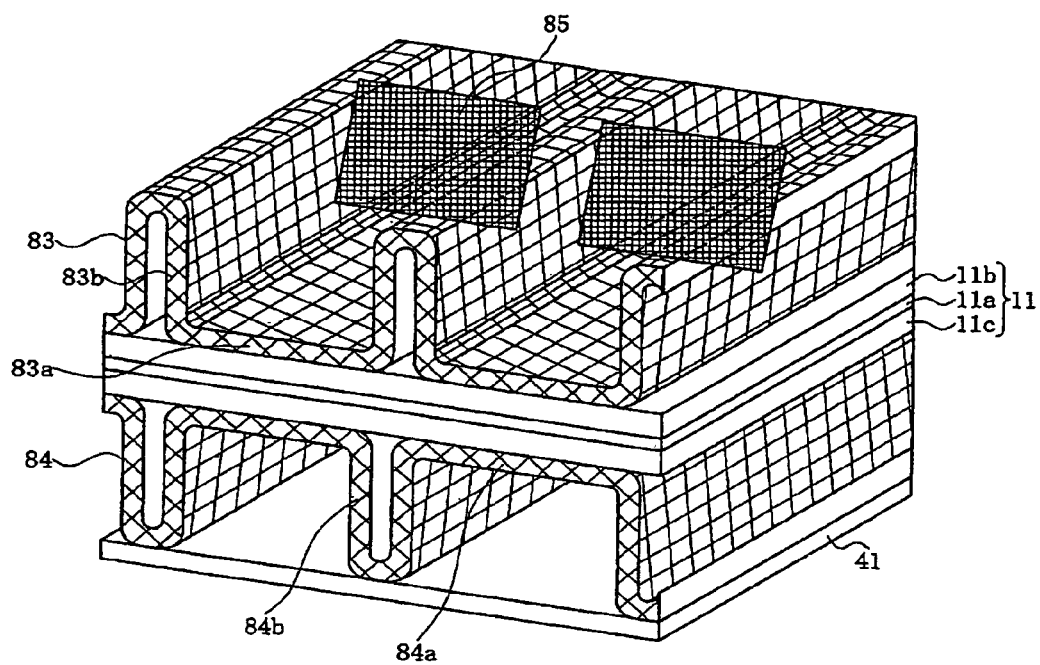
FIG. 11 is a perspective view representing collectors at the air electrode side and the fuel electrode side in the fuel cell system according to a fourth embodiment of the invention.

FIG. 11 is a view that represents a structure of the collectors at the air electrode and the fuel electrode sides in the fuel cell system according to the fourth embodiment of the invention.

In the embodiment, a collector 83 at the air electrode side is formed as a corrugated plate including thin projecting portions 83b formed through the press working process. The projecting portions 83b extend along the longitudinal side of the plate material, and arranged at equal intervals in parallel over the complete plate surface. The cross section of the projecting portion 83b has a substantially corrugated rectangular shape, with its base portion slightly widened resulting from punching out process in the press working. Likewise the first embodiment, the collector 83 at the air electrode is a porous body formed of a metal plate material with mesh-like openings, for example, an expand metal, a punching metal and the like. The collector 83 at the air electrode side is provided in the oxygen chamber within the unit cell 11 by abutting the flat surface of the base portion 83a between the projecting portions 83b against the air electrode 11b of the unit cell 11, and abutting the tip portion of the projecting portion 83b against the side surface of the separator base 41. The separator base 41 at the oxygen chamber side is not shown in FIG. 11.

As in the case of the collector 83 at the air electrode side, the collector 84 at the fuel electrode side is a porous body provided with a plurality of thin projecting portions 84b formed through the press working process. It may be formed of a metal plate material with mesh-like openings, for example, an expand metal, a punching metal and the like. The collector 84 at the fuel electrode side is provided in the fuel chamber within the unit cell 11 by abutting the flat surface of the base portion 84a between the projecting portions 84b against the fuel electrode 11c of the unit cell 11, and abutting the tip portion of the projecting portion 84b against the side surface of the separator base 41.

The portion between the projecting portions 83b of the collector 83 at the air electrode side is provided with a buffer plate or a baffle 85. The baffle 85 may be formed of a plate material with no opening, or a plate material having openings such as an expand metal and a punching metal with the mesh-like openings. In this case, the baffle 85 preferably has the area smaller than that of the cross section of the passage between the projecting portions 83b and is provided so as to be orthogonal to the passage.

As the baffle 85 causes the turbulence in air flowing through the oxygen chamber, the thermal exchange efficiency between air, and the collector 83 at the air electrode side and the unit cell 11 is enhanced, thereby improving the air cooling capability. Air within the oxygen chamber is allowed to flow through the openings of the projecting portion 83b. Even in the case where the flow of air between the projecting portions 83b is interrupted by the baffle 85, it is allowed to flow into the adjacent passage through the openings of the projecting portion 83b with no interruption.

The baffle 85 may be provided in the portion between the projecting portions 84b of the collector 84 at the fuel electrode side. In this case, as the turbulence occurs in the hydrogen gas flowing through the fuel chamber, the heat exchange efficiency between the hydrogen gas, and the collector 84 at the fuel electrode side and the unit cell 11 is enhanced, thereby improving the cooling capability of the hydrogen gas.

A fifth embodiment of the invention will be described in detail referring to the drawings.

Figure 13:
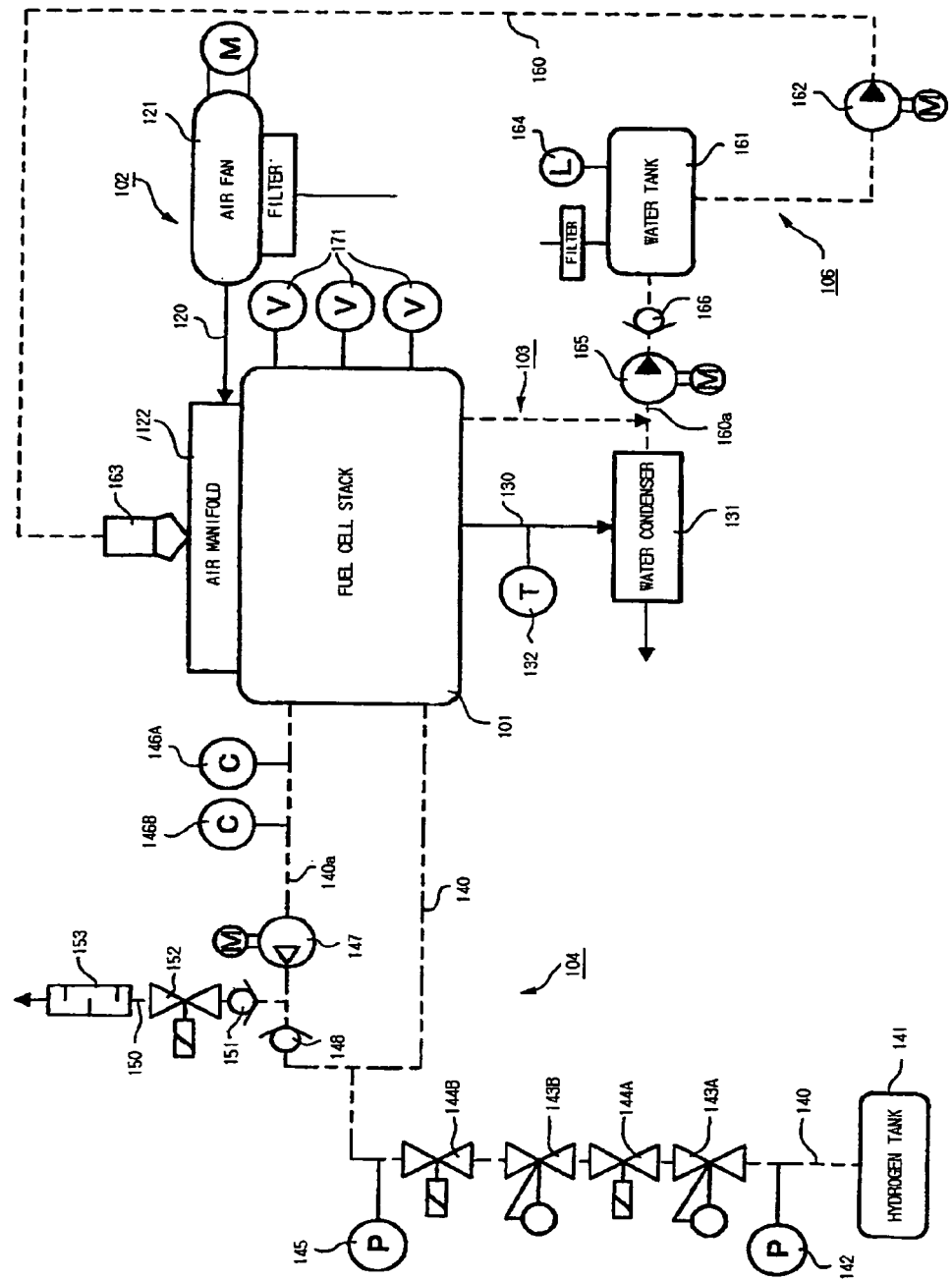
FIG. 13 is a view representing a structure of the fuel cell system according to the fifth embodiment of the invention.

FIG. 13 is a view representing a structure of a fuel cell system according to the fifth embodiment of the invention.

In FIG. 13, a fuel cell stack 101 serving as a fuel cell (FC) that is used as a power source for vehicles including passenger cars, buses, trucks, passenger carts, luggage carts and the like. Such vehicles are provided with a large number of power consuming accessories including a light unit, a radio, a power window and the like, which are used even when the vehicles are parked. The power source is required to provide substantially a wide range of outputs to cope with various operation patterns. Preferably the fuel cell stack 101 serving as the power source is used with a secondary battery serving as an electric storage device (not shown).

Preferably the fuel cell stack 101 is formed as a proton-exchange membrane fuel cell (PEMFC), although it may be alkaline solution fuel cell (AFC), a phosphoric acid fuel cell (PAFC), a molten carbonate fuel cell (MCFC), a solid oxide fuel cell (SOFC), a direct methanol fuel cell (DMFC) or the like.

More specifically, in the proton exchange membrane fuel cell (PEMFC or PEM), the hydrogen gas is used as the fuel, and oxygen or air is used as the oxidizer. The fuel cell of PEM type includes a stack formed by bonding a plurality of fuel cells in series, each having catalysts, electrodes and separators provided at both sides of the solid polymer electrolyte membrane that allows permeation of ions such as protons or the like.

The fuel cell system according to the embodiment is mainly formed of the fuel cell stack 101, a fuel cell base including an air supply system 102 (indicated by a solid line in FIG. 13) provided with an air fan 121 as an air supply member for supplying air serving as the oxidizer and the coolant, and an air discharge system 103 provided with a water condenser 131, a fuel supply system 104 (indicated by a chain double-dashed line in FIG. 13) including a hydrogen tank 141 as a hydrogen supply member for supplying hydrogen gas as the fuel, and a water supply system 106 (indicated by a broken line in FIG. 13) for supplying water to moisten and cool the reaction portion.

The air fan 121 is connected to an air manifold 122 via an air supply passage 120. The air manifold 122 is connected to an enclosure (not shown) that houses the fuel cell stack 101. The water condenser 131 in the air discharge system 103 is provided within an air discharge passage 130 of the enclosure so as to be connected to the fuel cell stack 101. The air discharge passage 130 is provided with an exhaust temperature sensor 132 therein.

The fuel supply system 104 is provided for supplying the hydrogen gas stored in the hydrogen tank 141 to a hydrogen passage of the fuel cell stack 101 via a hydrogen supply passage 140. The hydrogen supply passage 140 is provided with a hydrogen pressure sensor 142, a pressure regulating valve 143A, a supply electromagnetic valve 144A, a pressure regulating valve 143B, a supply electromagnetic valve 144B, and a hydrogen pressure sensor 145 therein in the order from the hydrogen tank 141 to the fuel cell stack 101. The hydrogen supply passage 140 is further provided with a hydrogen return path 140a and a hydrogen discharge path 150. The hydrogen return path 140a is provided with hydrogen concentration sensors 146A, 146B, a suction pump 147 and a check valve 148 in the order from the fuel cell stack 101. The hydrogen supply passage 140 is connected to a downstream portion of the check valve 148. A portion between the suction pump 147 and the check valve 148 in the hydrogen return path 140a is connected to the hydrogen discharge path 150 that is provided with a check valve 151, a hydrogen discharge valve 152 and a combustion chamber 153.

The water supply system 106 is provided for supplying water stored in a water tank 161 to a nozzle 163 attached to the air manifold 122 in the enclosure of the fuel cell stack 101 via a water supply passage 160 provided with a water pump 162. The water tank 161 is provided with a water level sensor 164. The water supply system 106 is further provided with a water return path 160a that connects the enclosure of the fuel cell stack 101 to the water tank 161, which is provided with a pump 165 and a check valve 166. The water return path 160a is connected to the water condenser 131 at the upstream portion of the pump 165. Voltmeters 171 shown in FIG. 13 serve to monitor the electrogenic pressure of the fuel cell.

Air supplied into the oxygen chamber of the fuel cell stack 101 may be maintained at the pressure equal to that of the atmosphere, or under pressure so as to be higher than the atmospheric pressure. In the embodiment, it is assumed that the atmospheric pressure is maintained. In other words, the fuel cell system according to the embodiment is operated at the normal pressure rather than pressurized state.

The fuel cell system according to the embodiment is provided with the same control unit as that described referring to FIG. 3. The control unit 81 is a computer that includes a calculation unit such as CPU and MPU, input/output interface, and the like for controlling operations of the fuel cell system. The control unit 81 is connected to a memory 82 as a data storage unit, for example, an electromagnetic disk and a semiconductor memory. The control unit 81 is connected to the voltmeter, the water level sensor, the hydrogen pressure sensor, the hydrogen concentration sensor and the exhaust temperature sensor. Various outputs of those devices are input to the control unit 81. Further, the control unit 81 is connected to the pressure regulating valves, the hydrogen discharge valve, the water pump, the air fan, and an alarm 86 that outputs an alarm upon failure and accident in the fuel cell system. Operations of these devices are controlled by the control unit 81.

The structure of the above described fuel cell stack 101 will be explained.

Figure 14:
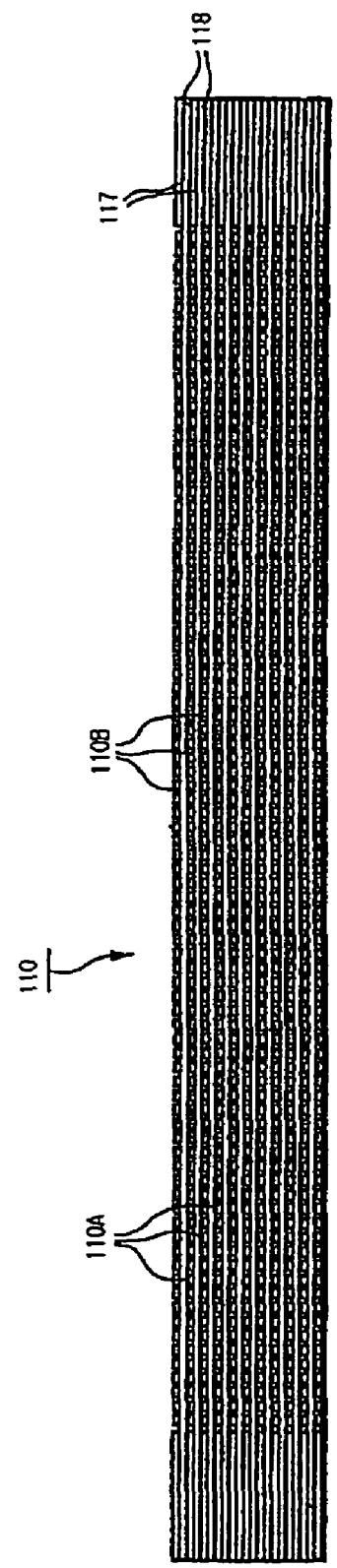
FIG. 14 is a view representing a structure of a cell module of the fuel cell according to the fifth embodiment of the invention.
Figure 15:
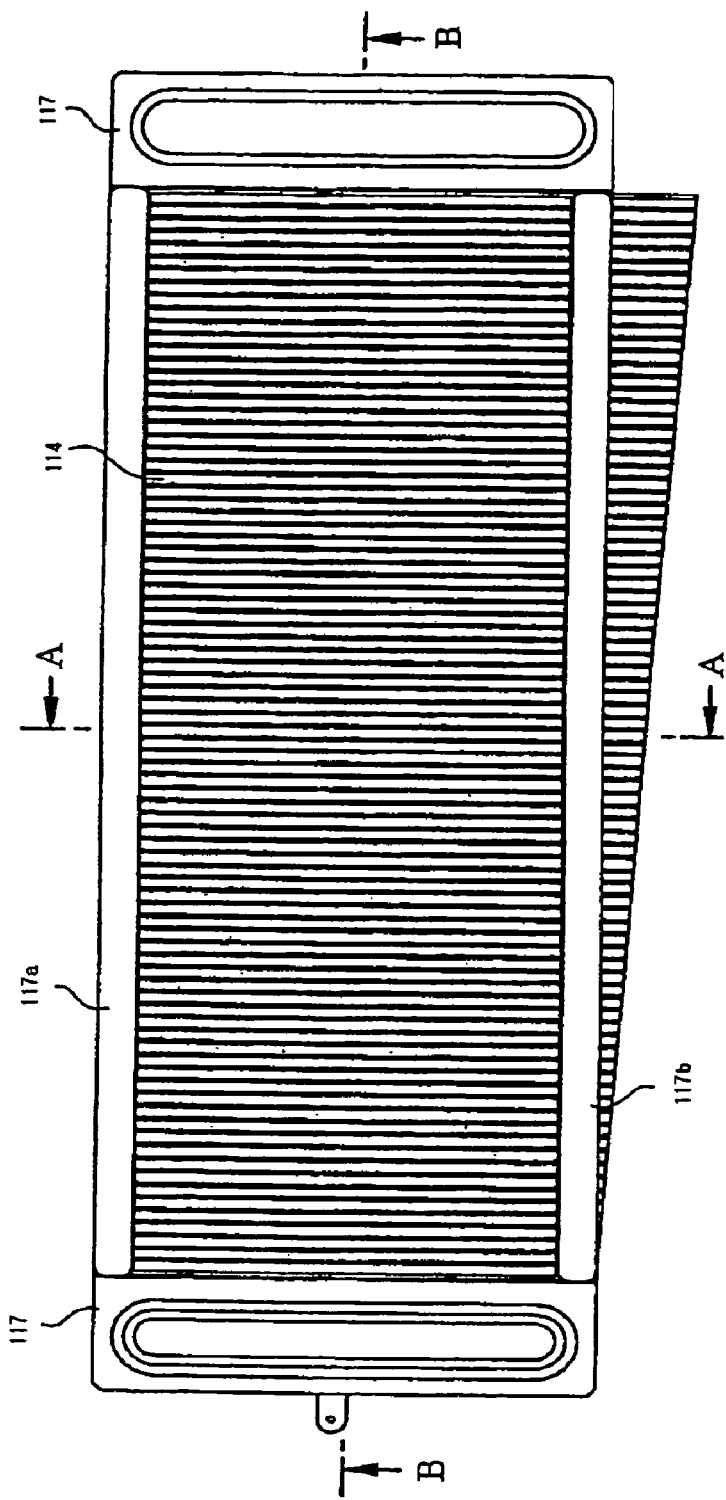
FIG. 15 is a first view representing a structure of a separator of the fuel cell according to the fifth embodiment of the invention.
Figure 16:
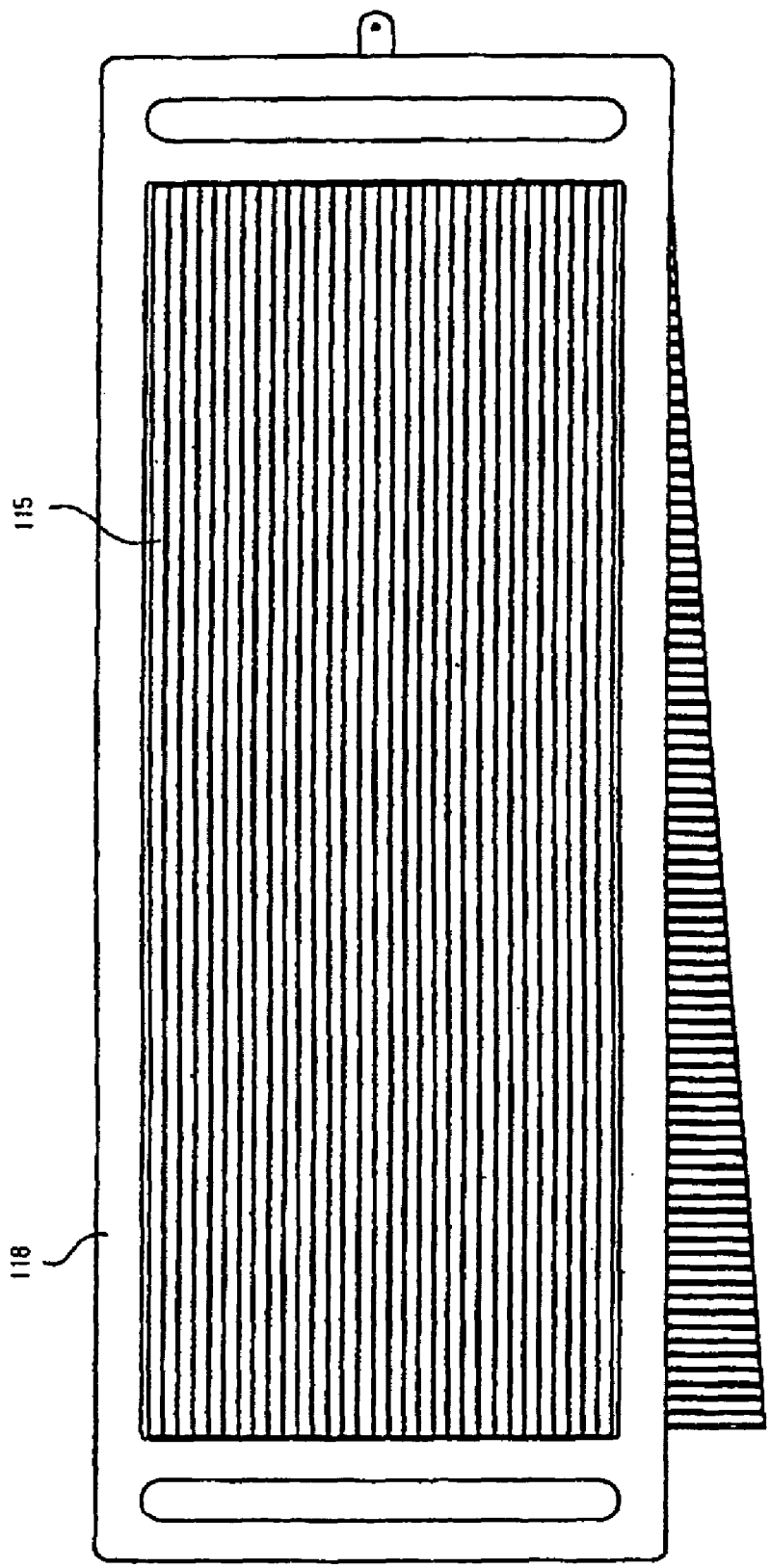
FIG. 16 is a second view representing the structure of the separator of the fuel cell according to the fifth embodiment of the invention.
Figure 17:
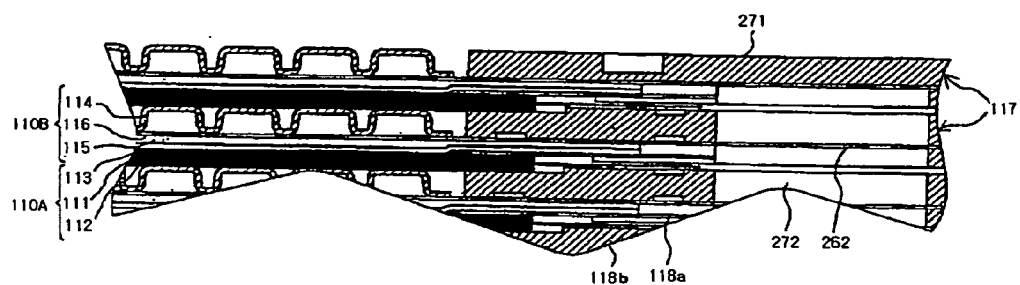
FIG. 17 is an enlarged sectional view of the first view representing the structure of the cell module of the fuel cell according to the fifth embodiment of the invention.
Figure 18:
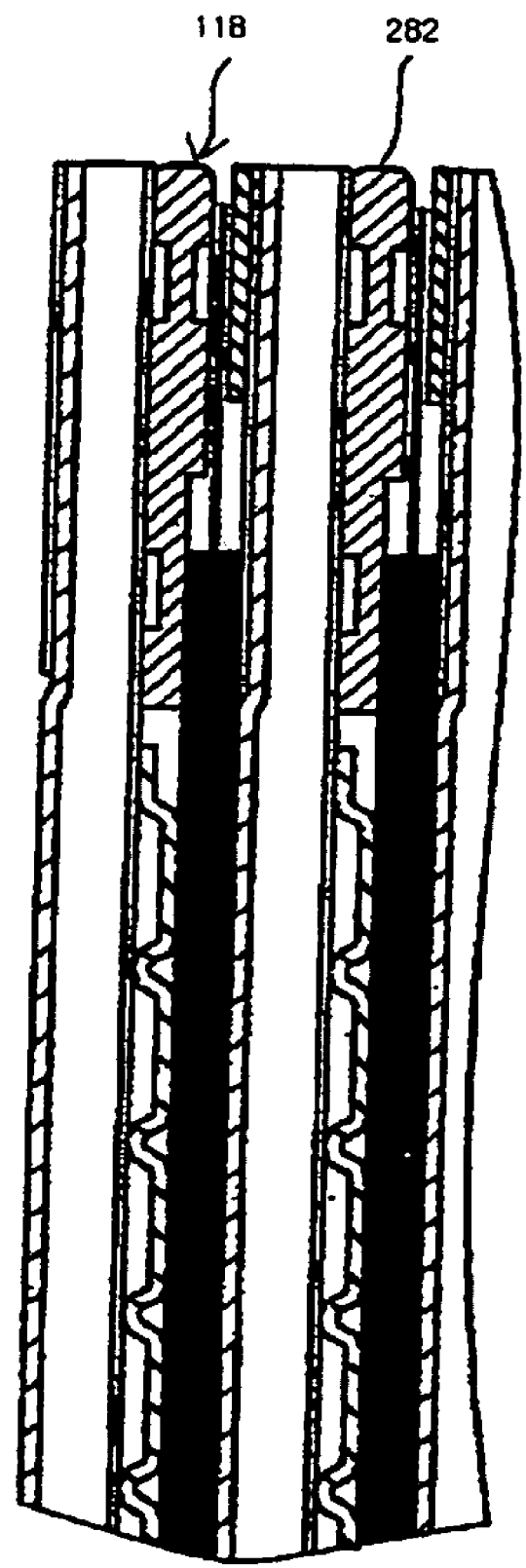
FIG. 18 is an enlarged sectional view of the second view representing the structure of the cell module of the fuel cell according to the fifth embodiment of the invention.
Figure 19:
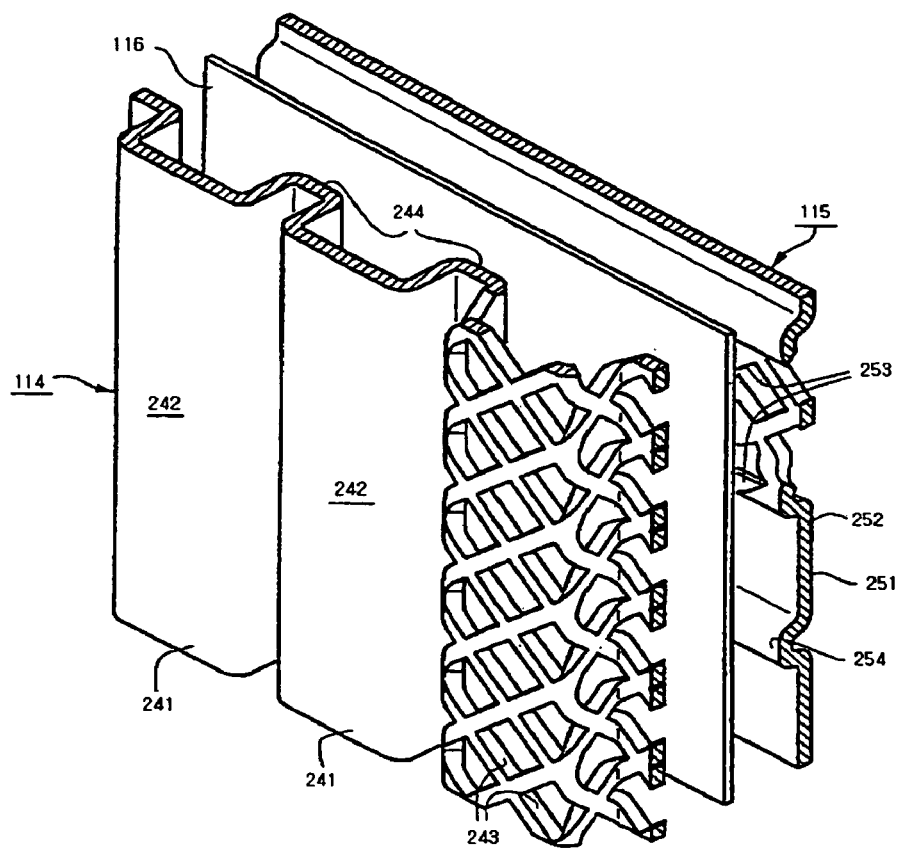
FIG. 19 is an enlarged perspective view that represents a structure of a unit cell of the fuel cell according to the fifth embodiment of the invention.

FIG. 14 is a view representing the structure of a cell module of the fuel cell according to the fifth embodiment of the invention. FIG. 15 is a first view representing a structure of a separator in the fuel cell according to the fifth embodiment of the invention. FIG. 16 is a second view representing a structure of the separator in the fuel cell according to the fifth embodiment of the invention. FIG. 17 is a first enlarged sectional view representing a cell module of the fuel cell according to the fifth embodiment of the invention. FIG. 18 is a second enlarged sectional view representing a cell module of the fuel cell according to the fifth embodiment of the invention. FIG. 19 is an enlarged perspective view representing a structure of a unit cell in the fuel cell according to the fifth embodiment of the invention.

According to the embodiment, the fuel cell stack 101 includes a plurality of cell modules 110. Referring to FIG. 14, the cell module 110 is formed of a plurality of sets of elements stacked in the thickness direction (10 sets in FIG. 14). Each set of elements includes a unit cell (MEA) 110A as the fuel cell, a separator 110B that electrically connects the unit cells 110A and separates a passage of the hydrogen gas introduced into the unit cell 110A from the passage of air, and two kinds of frames 117 and 118 that support the unit cell 110A and the separator 110B, respectively. The unit cell 110A is not clearly shown in FIG. 14 as it is positioned inside of the frame 118. In the cell module 110, the unit cells 110A and the separators 10B are stacked having the aforementioned two kinds of frames 117 and 118 interposed thereamong alternately such that the unit cells 110A are arranged at a predetermined gap. One end of the cell module 110 in the stack direction (upper end in FIG. 14) is terminated with the projecting portion forming surface in the longitudinal direction of the separator 110B and the end surface of the frame 117 as shown in FIG. 15. The other end of the cell module 110 (lower end in FIG. 14) is terminated with the projecting portion forming surface in the lateral direction of the separator 110B and the end surface of the frame 118.

Referring to the enlarged cross section of the structure shown in FIGS. 17 and 18, the unit cell 110A is formed of a solid polymer electrolyte membrane 111 as an electrolyte layer, an air electrode 112 (cathode electrode) as an oxygen electrode provided at one side of the solid polymer electrolyte membrane 111, and a fuel electrode 113 (anode electrode) provided at the other side of the solid polymer electrolyte membrane 111. FIG. 17 is an enlarged view of a portion of the sectional view taken along line B-B of FIG. 15. FIG. 18 is an enlarged view of a portion of the sectional view taken along line A-A of FIG. 15. Each of the air electrode 112 and the fuel electrode 113 includes an electrode diffusion layer formed of a conductive material that allows permeation and diffusion of the reactant gas, and a catalytic layer formed on the electrode diffusion layer, which contains the catalytic substance supported by the solid polymer electrolyte membrane 111 in contact therewith. Each of the air electrode 112 and the fuel electrode 113 has a lateral dimension that is slightly longer than the width of the opening of the frame 118 as the supporting member, and a longitudinal dimension that is slightly shorter than the height of the opening of the frame 118. The solid polymer electrolyte membrane 111 has both the longitudinal and lateral dimensions somewhat greater than those of the opening of the framer 118.

The separator 110B is a member that cuts the gas flowing between the unit cells 110A, which is formed of a separator base 116 as a main body of the separator, a collector 114 at the air electrode side provided at one side of the separator base 116 as a mesh-like collector having a plurality of openings that allow permeation of air/water mixture in contact with the electrode diffusion layer at the air electrode 112 of the unit cell 110A, and a collector 115 at the fuel electrode side provided at the other side of the separator base 116 as a mesh-like collector having a plurality of openings that allow the electric current to be introduced outside in contact with the electrode diffusion layer at the fuel electrode 113 of the unit cell 110A. Frames 117 at both left and right sides of the collector 114 at the air electrode side (only the outermost portion is connected with the back-up plates 117a and 117b at the upper and lower ends to form a frame shape as shown in FIG. 15) and frames 118 that surrounds the collector 115 at the fuel electrode side and the unit cell 110A are provided to maintain the aforementioned elements including the unit cell 110A in appropriate arrangement. Each of the collectors 114 and 115 at the air electrode and the fuel sides is formed of a conductive plate material, for example, a thin metal plate having a thickness of about 0.2 mm. The separator base 116 is a plate-like member formed of a thin plate having a thickness smaller than those of the collectors. The aforementioned material may be formed by subjecting the metal that exhibits conductivity and anti-corrosion property such as stainless steel, nickel alloy and titanium alloy to an anti-corrosion conductive treatment such as gold plating. The frames 117 and 118 are formed of appropriate insulating materials.

Referring to FIG. 15, the collector 114 at the air electrode side having substantially a rectangular shape with a long length in the lateral direction is formed of a porous body. In this case, only the bottom portion is inclined for the purpose of improving the drainage effect. As a partial enlarged portion in FIG. 19 shows, the porous body is formed of a metal plate material with mesh-like openings 243 at the aperture ratio of 59%, such as an expand metal and a punching metal. In FIG. 19, the mesh portion is partially shown for easy reference with respect to the plate surface structure. The above-described metal plate is formed into a corrugated plate provided with thin projecting portions 241 formed through a press working process. The projecting portions 241 are arranged at equal intervals in parallel with the shorter side of the plate material in the longitudinal direction of the plate as shown in FIG. 19 to cover the complete plate surface. The cross section of the projecting portion 241 is formed into a corrugated rectangular shape, having a base portion with slightly wider width resulting from punching out in the course of the press working. The height of the projecting portion 241 is substantially the same as the thickness of the frame 117 such that an air passage with a predetermined opening area is formed to pierce through the portion between the frames 117 in the longitudinal direction in the stack state. The flat surface of the tip portion 242 of the projecting portion 241 abuts against which the electrode diffusion layer at the air electrode 112. The base portion 244 between the projecting portions 241 abuts against the separator base 116.

The collector 114 at the air electrode side is subjected to a hydrophilic treatment by applying a hydrophilic agent to the surface of the collector. Polyacrylamid, polyurethane resin, titanic oxide ($TiO_2$) may be employed as the hydrophilic agent to be applied. The process for roughening the metal surface may be employed as the hydrophilic process, for example, plasma treatment. Preferably the hydrophilic treatment is applied to the portion at the highest humidity. For example, the hydrophilic treatment is applied to the tip portion 242 of the projecting portion 241 in contact with the unit cell 110A, particularly, the portion at the air passage side. The hydrophilic treatment facilitates moistening of the abutment surface between the collector 114 at the air electrode side and the electrode diffusion layer at the air electrode 112 side so as to improve the effect resulting from cooling of the latent heat with water. This may avoid stagnation of water in the mesh portion, that is, openings 243, so as to further reduce the possibility that water interrupts the air flow.

The collector 115 at the fuel electrode side is formed of a rectangular plate material having the mesh-like openings 253 each having the same size as those formed in the collector 114 at the air fuel electrode side, for example, an expand metal, a punching metal or the like. In this case, only a part of the meshed portion is shown for the purpose of easy reference with respect to the plate shape. A plurality of projecting portions 251 are derived from an extraction molding through the press working process. The projecting portion 251 has a flat tip portion 252 and a substantially corrugated rectangular cross section similar to that of the projecting portion 241. The projecting portions 251 of the collector 115 at the fuel electrode side extend across the plate surface in a lateral direction at constant pitches in the longitudinal direction. The flat surface of the tip portion 252 of the projecting portion 251 serves as a portion that abuts against the fuel electrode 113. The base portion 254 between the projecting portions 251, 251 serves as the portion that abuts against the separator base 116. The cross section of each of those projecting portions 251 has a substantially corrugated rectangular shape with its base portion slightly widened resulting from punching out in the course of the press working. The height of the projecting portion 251 is substantially the same as each of the thickness of the frame 118 and the thickness of the unit cell 110A. The fuel gas passage with a predetermined opening area is formed, which laterally extends through the inside of the frame 118 in the stack state.

The collectors 114 and 115 at the air electrode and the fuel electrode sides are arranged to interpose the separator base 116 therebetween such that the respective projecting portions 241 and 251 are outwardly placed. The base portions 244 and 254 formed in the collectors 114 and 115 at the air electrode and the fuel electrode sides abut against the separator base 116 so as to be brought into a state that allows application of electric current between those portions. The collectors 114 and 115 at the air electrode and the fuel electrode sides are stacked having the separator base 116 interposed therebetween so as to form an air passage through which the oxidizer flows, that is, the oxygen chamber at one side of the separator base 116, and a fuel gas passage, that is, the fuel chamber at the other side. The air electrode 112 of the unit cell 110A receives the supply of air and water from the air passage along the longitudinal direction, and likewise, the fuel electrode 113 of the unit cell 110A receives the supply of the hydrogen gas from the fuel passage along the lateral direction.

The separator 110B is provided with the frames 117 and 118 at the outer side, respectively. Referring to FIGS. 17 and 18, the frame 117 that encloses the collector 114 at the air electrode side is provided with a longitudinal frame portion 271 that surrounds both sides along the shorter side of the collector 114 at the air electrode side except the outer end portion (the upper most portion shown in FIG. 17, and the left end shown in FIG. 18). The frame 117 has a long hole 272 that pierces through the longitudinal frame portion 271 in the thickness direction for the purpose of forming the fuel gas passage. The thickness of the frame 117 is substantially the same as that of the corrugated plate-like collector 114 at the air electrode side. In the state where the frame 117 is combined with the collector 114 at the air electrode side, the projecting portion 241 of the collector 114 at the air electrode side is in contact with the air electrode 112 of the unit cell 110A, and the base portion 244 is in contact with the collector 115 at the fuel electrode side via the separator base 116. The outer dimension of the separator base 116 has its height and entire width corresponding to those of the frame 117. A long hole 262 is formed in the separator base 16 at a position corresponding to the long hole 272 formed in the frame 117. The air passage surrounded by the air electrode 112 of the unit cell 110A and the separator base 116 is defined at a portion between the longitudinal frame portions 271 of the frame 117 in the longitudinal direction.

The frame 118 that encloses the collector 115 at the fuel electrode side and the unit cell 110A has the structure with the same size as that of the structure of the frame 117. Unlike the frame 117, however, the frame 118 has a completely bar-like shape including right and left longitudinal frame portions and upper and lower lateral frame portions 282. Each of the left and right longitudinal frame portions of the frame 118, with both ends at the same positions as those of the left and right ends of the longitudinal frame portions of the frame 117 has substantially the same lateral width as that of the upper and lower lateral frame portions. They are not shown in FIG. 17 since they are positioned further rightward beyond the description range. The frame 118 extends in parallel with the left and right longitudinal frame portions except the outer end portion (the lower most portion shown in FIG. 14, the surface shown in FIG. 16), and is provided with a thin plate-like back-up plate 118*a* and a thick plate-like back-up plate 118*b* which are stacked at the left and right end portions of the collector 115 at the fuel electrode side. The space defined by the back-up plate 118*a* and the longitudinal bar portion serves to form the fuel gas passage that is aligned with the long hole 272 piercing through the frame 117 in the thickness direction. The thickness of the frame 118 is substantially equal to each of the thicknesses of the corrugated plate-like collector 115 at the fuel electrode side and the thickness of the unit cell 110A. In the state where the frame 118 is combined with the collector 115 at the fuel electrode side, the projecting portion 251 of the collector 115 at the fuel electrode side is in contact with the fuel electrode 113 of the unit cell 110A, and the base portion 254 is in contact with the collector 114 at the air electrode side via the separator base 116. The fuel gas passage aligned with the long hole 272 of the longitudinal frame portion 271 of the frame 117 is formed in the frame stack direction between the longitudinal bar portion of the frame 118 and the back-up plate 118*a*. The fuel gas passage as the lateral passage interposed between the separator base 116 and the back-up plate 118*a* is defined inside of the respective frames 118 by the corrugation of the collector 115 at the fuel electrode side.

The separator 110B is formed of the thus formed frames 117 and 118 while holding the collectors 114 and 115 at the air electrode and the fuel electrode sides and the separator base 116. Then the separators 110B and the unit cells 110A are alternately stacked to form the cell module 110. In the thus stacked cell module 110, the slit-like air passage that pierces from the upper surface to the lower surface of the cell module 110 in the vertical direction is formed in the portion interposed between the frames 118.

The unit cell 110A allows water to flow therethrough. Specifically, when the hydrogen gas is supplied as the fuel gas into the fuel chamber of the collector 115 at the fuel electrode side, the hydrogen is decomposed into hydrogen ions (protons) and electrons. The hydrogen ions then permeate the solid polymer electrolyte membrane 111 together with carrier water. Assuming that the air electrode 112 serves as the cathode electrode, when air is supplied into the oxygen chamber as the oxidizer, oxygen contained in air is bonded to the hydrogen ions and electrons to generate water. Water content as the back diffusion water further permeates the solid polymer electrolyte membrane 111 so as to flow into the fuel chamber. The back diffusion water represents water generated within the oxygen chamber, which diffuses in the solid polymer electrolyte membrane 111, and further permeates therethrough in the reverse direction of the hydrogen ions to reach the fuel chamber.

The structure of the collector 14 at the air electrode side will be described in detail.

Figure 12:
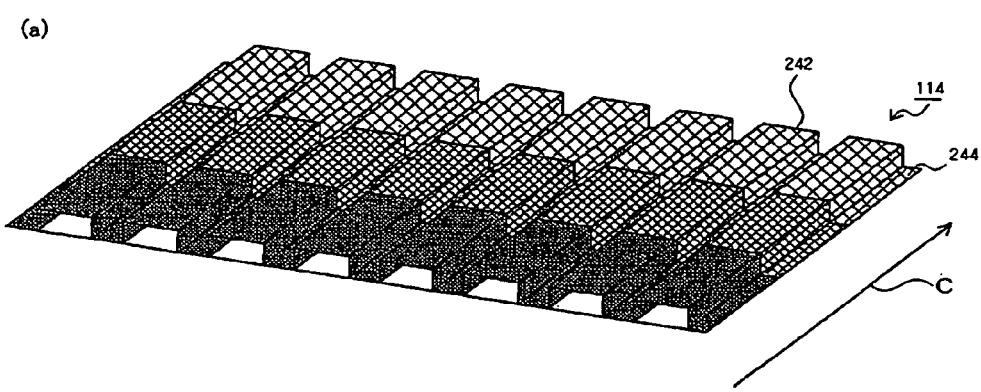
FIG. 12 represents a collector at the air electrode side of the fuel system according to a fifth embodiment of the invention.
Figure 12:
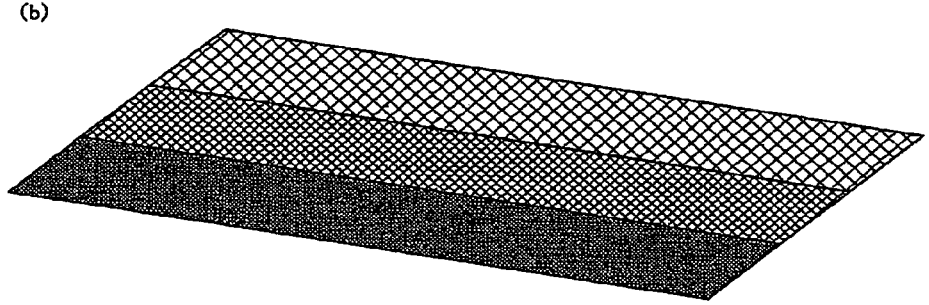

FIG. 12 represents the collector at the air electrode side of the fuel cell according to the fifth embodiment of the invention. FIG. 12A is a perspective view of the collector at the air electrode side, and FIG. 12B is a perspective view of a plate material having mesh-like openings forming the collector at the air electrode side.

In the embodiment, the collector 114 at the air electrode side is structured to locally vary the aperture ratio. More specifically, the aperture ratios at the respective areas of the collector 114 at the air electrode side are graded in the gravity direction as shown by arrow C of FIG. 12A. That is, the aperture ratio is increased as the area proceeds downstream of the gravity direction, that is, in the downward direction. In the example shown in FIG. 12A, the collector 114 at the air electrode side is divided into three areas each having the different aperture ratio. The upper most area has the lowest aperture ratio, the intermediate area has the intermediate aperture ratio, and the lower most area has the highest aperture ratio. The collector 114 at the air electrode side shown in FIG. 12A may be formed by press working the plate material 114*a* as shown in FIG. 12B with three areas each having the different aperture ratio. The aperture ratio may be varied in two stages, or in four or more stages. Alternatively, it may be varied continuously. The collector 115 at the fuel electrode side may have the structure in which the aperture ratio is varied as in the case of the collector 114 at the air electrode side.

As each of the collectors 114 and 115 at the air electrode and the fuel electrode sides has mesh-like openings 243 and 253, respectively, each flow of the hydrogen gas within the fuel chamber and air within the oxygen chamber is not interrupted by those collectors 114 and 115. That is, the hydrogen gas within the fuel chamber and air within the oxygen chamber are sufficiently in contact with the fuel electrode 113 and the air electrode 112 of the unit cell 110A via the openings 243 and 253 of the tip portions 242 and 252 in contact with the unit cell 110A, respectively. The hydrogen gas within the fuel chamber and air within the oxygen chamber are allowed to flow through the openings 243 and 253 of the projecting portions 241 and 251, respectively, so as to make the flow of the hydrogen gas through the fuel chamber and the flow of air through the oxygen chamber smooth.

Especially in the case where a water droplet generated in the oxygen chamber owing to produced water or water supplied into air blocks the passage of the adjacent base portion 244, air is allowed to flow into the adjacent passage through the openings 243 of the side wall of the projecting portion 241. The flow of air, thus, is not interrupted. The aperture ratio of the collector 114 at the air electrode side varies in stages in the gravity direction. More specifically, as the aperture ratio is increased as the corresponding area proceeds downward, diffusion of water is facilitated, thus preventing stagnation of water within the passage. Air is thus allowed to flow without interruption of water. This makes it possible to reliably prevent water stagnation within the passage of the oxidizer. In the case where the collector 115 at the fuel electrode side has the aperture ratio that varies like the collector 114 at the air electrode side, the same effect as that in the collector 114 may be obtained when the water droplet is generated in the fuel chamber owing to the back diffusion water.

The operation of the above-structured fuel cell system will be described.

The operation of the embodiment which is similar to that of the first embodiment will be described referring to FIGS. 7 and 8.

The process for the startup operation will be described. In step S1, a start switch (not shown) is turned ON by an operator for starting the fuel cell system. Then in step S2, a water pump 162 is turned ON, and water is injected through a nozzle 163. At this time, the operation of the water pump 162 is adjusted so as to inject a predetermined quantity of water. Otherwise, the abnormal combustion may be caused by the supply of the hydrogen gas to the solid polymer membrane 111 in a dry state, since air is present within the unit cell 11 at the time of start-up of the fuel system, irrespective of whether the air supply system is ON or not. Accordingly the air electrode 112 of the unit cell 110A has to be preliminarily in a wet state by water supplied before supply of the hydrogen gas so as not to damage the unit cell 110A under the abnormal heat caused by the abnormal combustion. This makes it possible to convert the abnormally excessive heat into the evaporated heat and further to facilitate moistening of the solid polymer electrolyte membrane 111 for preventing the damage exerted to the unit cell 110A.

Then in step S3, the device for supplying air as the oxidizer to the fuel cell stack 101, that is, the air supply system 102 is turned ON. In this case, the control is executed to maximize the quantity of air supplied by the air supply fan 121 such that no abnormal reaction occurs in the unit cell 110A of the fuel cell stack 101. Then in step S4, the device for supplying the hydrogen gas as the fuel gas to the fuel cell stack 101, that is, the hydrogen supply system is turned ON. The start-up operation, thus, ends. The fuel cell system operation transfers into the normal phase such that the electricity generated by the fuel cell stack 101 is supplied to the loads or the secondary battery.

After the start-up routine ends, the control of hydrogen gas supply quantity, air supply quantity, and water supply quantity will be executed simultaneously. Under the control of hydrogen gas supply quantity, the pressure regulating valves 143A and 143B are adjusted such that the hydrogen gas is supplied to the fuel electrode 113 at a predetermined concentration equal to the explosive limit or lower. The hydrogen discharge valve 152 which is closed during start-up is opened based on the predetermined rule so as to discharge the fuel gas at the reduced hydrogen partial pressure for refreshing the atmospheric gas of the fuel electrode 113. The predetermined rule as described above is stored in the memory 82 which is referred upon execution of the regulation of the pressure regulation valves 143A and 143B, and switching operation of the hydrogen discharge valve 152 by the control unit 81. The hydrogen discharge valve 152 is appropriately opened during the operation to stabilize the voltage. The hydrogen discharge valve 152 is opened on the ground that if the fuel cell system is operated while keeping the hydrogen discharge valve 152 closed, the partial pressure of the hydrogen consumed by the fuel electrode 113 is gradually decreased under the influence of $N_2$, $O_2$ or the produced water permeating the air electrode 112, and the output voltage of the fuel cell stack 101 is reduced accordingly.

Under the air supply quantity control, first in step S11, the temperature of air immediately after discharged from the fuel cell stack 101 is detected by the exhaust temperature sensor 132. Then in step S12, the control unit 81 determines whether the detected temperature of the discharged air is equal to or lower than 80° C. If it is determined that the temperature of the discharged air is not equal to or lower than 80° C., that is, in excess of 80° C., the process proceeds to step S13 where an air volume is increased by the control unit 81 so as to prevent burning of the unit cell 110A. More specifically, air supply quantity is increased by increasing the rotating speed of the air fan 121 so as to reduce the temperature of the air electrode 112 serving as the heat source.

Meanwhile if it is determined that the temperature of the discharge air is equal to or lower than 80° C., the load of the fuel cell stack 101, that is, the load of the base body of the fuel cell is detected by the control unit 81 in step S14. Then in step S15, it is determined whether the air supply quantity, that is, air volume is appropriate. In this case, the determination is made by referring to the table of the relationship between the load of the fuel cell stack 101 and the air volume required in the respective states, which is stored in the memory 82. If it is determined that the air volume is inappropriate, the control unit 81 adjusts the air volume in step S16. More specifically, the rotating speed of the air fan 121 is adjusted to control the air volume. If it is determined that the air volume is appropriate, the process ends.

Under the hydrogen gas supply quantity control, the hydrogen gas pressure at the fuel tank 141 is detected by the hydrogen pressure sensors 142 and 145. The control unit 81 regulates the pressure regulation valves 143A and 143B such that the pressure of the hydrogen gas supplied to the fuel cell stack 101 becomes a predetermined value. The control unit 81 controls a switching operation of the fuel supply electromagnetic valves 144A and 144B so as to control the hydrogen gas supply to the fuel cell stack 101. The fuel supply electromagnetic valves 144A and 144B may be closed for cutting the supply of the hydrogen gas to the fuel cell stack 101.

In the embodiment, the collector 114 at the air electrode side is structured to have the aperture ratio locally varied, that is, graded in the gravity direction. In this case, the aperture ratio of the collector 114 at the air electrode side is increased as the area proceeds downward. This may facilitate water diffusion for preventing stagnation of water within the passage, thereby keeping the air flow from being interrupted by water. This makes it possible to effectively cool the unit cell 110A even in the high humidity environment so as to improve the cooling capability and power generation efficiency of the fuel cell stack 101 as well as stabilize the operation.

Especially in the case where a water droplet generated in the oxygen chamber, which is caused by the produced water or water supplied into air, and such water droplet is likely to block the passage in the adjacent base portion 244, the water diffusion may be facilitated to prevent stagnation of water within the passage. The air flow, thus, is not interrupted by water.

As in the case of the collector 114 at the air electrode side, the collector 115 at the fuel electrode side is structured to have the aperture ratio locally varied so as to be graded in the gravity direction. In this case, the water stagnation may be prevented within the passage of the hydrogen gas. The flow of the hydrogen gas, thus, is kept from the interruption of water.

The mesh-like openings formed in the collectors 114 and 115 at the air electrode and fuel electrode sides prevent the air flow from being interrupted by those collectors 114 and 115. That is, the hydrogen gas within the fuel chamber and air within the oxygen chamber are sufficiently in contact with the electrode diffusion layers of the fuel electrode 113 and the air electrode 112 of the unit cell 110A via the openings 243 and 253 of the tip portions 242 and 252 in contact with the unit cell 110A. The hydrogen gas within the fuel chamber and air within the oxygen chamber are allowed to flow through the openings 243 and 253 of the projecting portions 241 and 251, respectively so as to make the flow of the hydrogen gas within the fuel chamber and the flow of air within the oxygen chamber smooth.

It should be noted that the invention is not limited to the above described embodiments, and may be modified into various forms without departing from the scope of the invention.

What is claimed is:

1. A separator unit inserted into a proton exchange membrane fuel cell having a solid polymer electrolyte layer interposed between a fuel electrode and an oxygen electrode, comprising:

a plate shaped separator base that separates hydrogen gas supplied to the fuel electrode from air supplied to the oxygen electrode, wherein the fuel cell is operated at atmospheric pressure;

a collector provided to at least one side of the separator base, which is provided with a mesh opening and in abutment against one of the fuel electrode and the oxygen electrode to radiate a heat generated in the fuel cell, wherein the collector is formed into a corrugated plate provided with thin projecting portions and includes a turbulence generating unit that generates a turbulence in the gas to increase an opportunity of a contact between the gas and one of the fuel electrode and the oxygen electrode, and to improve an efficiency of radiating the heat generated in the fuel cell; and wherein a flat surface of a tip portion of each thin projecting portion abuts against an electrode diffusion layer at the oxygen electrode and a base portion of each thin projecting portion abuts against the separator base.

2. The separator unit according to claim 1, wherein the collector has an aperture ratio of 59 percent or higher.

3. The separator unit according to claim 1, wherein the corrugations of the corrugated plate shaped collector have side wall portions formed between the tip portions and the base portions;

the base portions having a first aperture ratio;
the tip portions having a second aperture ratio; and
the side wall portions having a third aperture ratio in a range between the first and second aperture ratios.

4. The separator unit according to claim 1, wherein the collector has offset cylindrical shaped protrusions formed thereon to form the turbulence generating unit.

5. The separator unit according to claim 1, wherein the collector has offset corrugated projections formed thereon to form the turbulence generating unit.

6. The separator unit according to claim 1, wherein baffles positioned between adjacent thin projecting portions to form the turbulence generating unit.

7. The separator unit according to claim 6, wherein each baffle is a plate material having openings formed therein and having a cross sectional area that is smaller than a cross section of a passage formed between adjacent projecting portions in which the baffle is positioned.

8. A separator unit inserted into a proton exchange membrane fuel cell having a solid polymer electrolyte layer interposed between a fuel electrode and an oxygen electrode, comprising:

a plate shaped separator base that separates hydrogen gas supplied to the fuel electrode from air supplied to the oxygen electrode, wherein the fuel cell is operated at atmospheric pressure;

a collector provided to at least one side of the separator base, which is provided with a mesh opening and in abutment against one of the fuel electrode and the oxygen electrode to radiate a heat generated in the fuel cell, wherein the collector is formed into a corrugated plate provided with thin projecting portions and has an aperture ratio that varies to be higher as an area of the collector proceeds downward toward a gravity direction; and wherein a flat surface of a tip portion of each thin projecting portion abuts against an electrode diffusion layer at the oxygen electrode and a base portion of each thin projecting portion abuts against the separator base.

9. The separator unit according to claim 8, wherein the projecting portions and base portions extend in the gravity direction, and are alternately formed.

10. A fuel cell stack formed by stacking proton exchange membrane fuel cells each having a solid polymer electrolyte layer interposed between a fuel electrode and an oxygen electrode with a separator unit inserted therein, wherein:

the separator unit includes a plate shaped separator base that separates hydrogen gas supplied to the fuel electrode from air gas supplied to the oxygen electrode, wherein the fuel cell is operated at atmospheric pressure, and a collector provided to at least one side of the separator base, which is provided with a mesh opening and in abutment against one of the fuel electrode and the oxygen electrode to radiate a heat generated in the fuel cells;

the collector is formed into a corrugated plate provided with thin projecting portions and has an aperture ratio that varies to be lower toward a direction in which the fuel cells are stacked; and wherein a flat surface of a tip portion of each thin projecting portion abuts against an electrode diffusion layer at the oxygen electrode and a base portion of each thin projecting portion abuts against the separator base.

11. The fuel cell stack according to claim 10, wherein the collector includes a rib portion between the tip portion and the base portion, each aperture ratio of which establishes a relational expression:

$$\text{aperture ratio of the tip portion} > \text{aperture ratio of the rib portion} \geq \text{aperture ratio of the base portion} \quad (1).$$

12. A fuel cell stack formed by stacking proton exchange membrane fuel cells each having a solid polymer electrolyte layer interposed between a fuel electrode and an oxygen electrode with a separator unit inserted therein, wherein:

the separator unit includes a plate shaped separator base that separates hydrogen gas supplied to the fuel electrode from air supplied to the oxygen electrode, wherein the fuel cell is operated at atmospheric pressure, and a collector provided to at least one side of the separator base, which is provided with a mesh opening and in abutment against one of the fuel electrode and the oxygen electrode to radiate a heat generated in the fuel cells;

the collector is formed into a corrugated plate provided with thin projecting portions and has an aperture ratio that varies to be higher in a direction orthogonal to a direction in which the fuel cells are stacked; and wherein a flat surface of a tip portion of each thin projecting portion abuts against an electrode diffusion layer at the oxygen electrode and a base portion of each thin projecting portion abuts against the separator base.

13. The fuel cell stack according to claim 12, wherein the aperture ratio varies to be higher as an area of the collector proceeds downward in the gravity direction.

* * * * *